United States Patent
Kojima

(10) Patent No.: US 12,076,983 B2
(45) Date of Patent: Sep. 3, 2024

(54) PRINTER, DATA TRANSMISSION METHOD, AND STORAGE MEDIUM STORING COMPUTER PROGRAM

(71) Applicant: BROTHER KOGYO KABUSHIKI KAISHA, Nagoya (JP)

(72) Inventor: Takuya Kojima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 143 days.

(21) Appl. No.: 18/046,978

(22) Filed: Oct. 17, 2022

(65) Prior Publication Data
US 2023/0166496 A1    Jun. 1, 2023

(30) Foreign Application Priority Data
Nov. 30, 2021    (JP) .................. 2021-194274

(51) Int. Cl.
| B41J 2/045 | (2006.01) |
| G06K 15/00 | (2006.01) |
| G06K 15/10 | (2006.01) |
| H04L 1/16  | (2023.01) |

(52) U.S. Cl.
CPC ......... B41J 2/0451 (2013.01); B41J 2/04586 (2013.01); G06K 15/102 (2013.01); G06K 15/408 (2013.01); H04L 1/16 (2013.01)

(58) Field of Classification Search
CPC ........ B41J 2/155; B41J 2202/20; B41J 2/045; G06F 3/1211; G06F 3/1215; G06F 3/1217; G06F 3/1279; G06K 15/1894; G06K 15/1898
See application file for complete search history.

(56) References Cited

U.S. PATENT DOCUMENTS

| 2010/0073416 A1 | 3/2010 | Yokota |
| 2011/0066822 A1 | 3/2011 | Ikeda |

FOREIGN PATENT DOCUMENTS

| JP | 11-338523 A   | 12/1999 |
| JP | 2010-76142 A  | 4/2010  |
| JP | 2010-76147 A  | 4/2010  |
| JP | 2011-81769 A  | 4/2011  |
| JP | 2017-11706 A  | 1/2017  |

OTHER PUBLICATIONS

Office Action issued in corresponding Japanese patent application 2021-194274, Feb. 6, 2024.

*Primary Examiner* — Julian D Huffman
(74) *Attorney, Agent, or Firm* — Merchant & Gould P.C.

(57) ABSTRACT

A plurality of sub control circuits are connected to respective ones of a plurality of head units. One of the plurality of sub control circuits is connected to a main control circuit so as to perform communication. The plurality of sub control circuits include a first control circuit and a second control circuit. The second control circuit is connected to the first control circuit in series so as to perform communication. The first control circuit is configured to: receive first data, the first data including a first parameter and a second parameter, the first parameter corresponding to the first control circuit, the second parameter corresponding to the second control circuit; and transmit the first data to the second control circuit. The second control circuit is configured to: receive the first data from the first control circuit; and delete the first parameter from the first data.

20 Claims, 16 Drawing Sheets

*FIG. 5A* INDIVIDUAL PARAMETER DATA RECEIVED BY SoC 41(1)

| | INDIVIDUAL PARAMETER 1 |
|---|---|
| 1 ... 0 0 1 | |
| 1 ... 0 1 0 | INDIVIDUAL PARAMETER 2 |
| 1 ... 1 0 0 | INDIVIDUAL PARAMETER 3 |

*FIG. 5B* INDIVIDUAL PARAMETER DATA RECEIVED BY SoC 41(2)

| | INDIVIDUAL PARAMETER 1 |
|---|---|
| 1 ... 0 0 0 | |
| 1 ... 0 1 0 | INDIVIDUAL PARAMETER 2 |
| 1 ... 1 0 0 | INDIVIDUAL PARAMETER 3 |

*FIG. 5C* INDIVIDUAL PARAMETER DATA RECEIVED BY SoC 41(3)

| | INDIVIDUAL PARAMETER 2 |
|---|---|
| 1 ... 0 0 0 | |
| 1 ... 1 0 0 | INDIVIDUAL PARAMETER 3 |

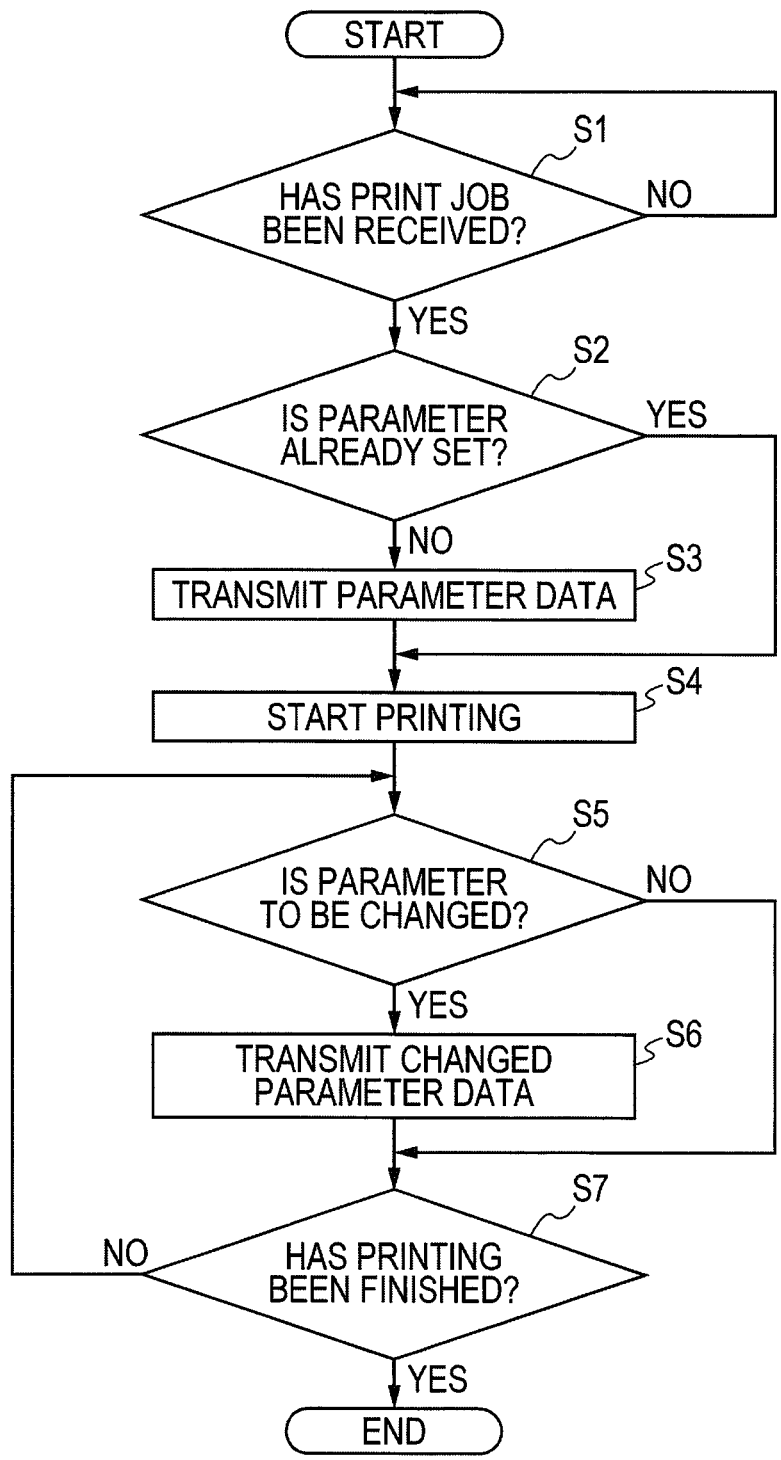

PRINTER, DATA TRANSMISSION METHOD, AND STORAGE MEDIUM STORING COMPUTER PROGRAM

REFERENCE TO RELATED APPLICATIONS

This application claims priority from Japanese Patent Application No. 2021-194274 filed on Nov. 30, 2021. The entire content of the priority application is incorporated herein by reference.

BACKGROUND ART

A liquid ejection apparatus includes a main control board, a plurality of head control boards (HC boards), and a head. The head has a plurality of nozzle groups. Each HC board corresponds to each nozzle group. Each HC board is connected by daisy chain.

DESCRIPTION

Identification information is transmitted from a main control board to a first (most upstream) HC board. The first HC board stores the received identification information, changes the identification information according to a particular rule, and transmits the changed identification information to the downstream HC board. The downstream HC board stores the received identification information, changes the identification information according to the rule, and transmits the changed identification information to the further downstream HC board. In this way, each HC board stores identification information.

The main control board transmits image data and a synchronization signal to the first HC board. Each HC board sequentially transmits the image data and the synchronization signal to the downstream side. Based on the image data corresponding to its own identification information, each HC board ejects liquid droplets from each nozzle group at a timing corresponding to the synchronizing signal.

The upper limit of the throughput per unit time in each HC board is substantially constant. As the amount of data such as image data and synchronization signals increases, the processing time required, after receiving the data, for each HC board to extract image data corresponding to its own identification information and to drive the nozzle groups increases, and the printing speed decreases.

In view of the foregoing, an example of an object of this disclosure is to provide a printer, a data transmission method, and a storage medium storing a computer program configured to suppress an increase of processing time in each circuit that controls driving of a head and to suppress a decrease in printing speed.

According to one aspect, this specification discloses a printer. The printer includes a plurality of head units each having a nozzle, a main control circuit, and a plurality of sub control circuits. The plurality of sub control circuits are connected to respective ones of the plurality of head units. One of the plurality of sub control circuits is connected to the main control circuit so as to perform communication. The plurality of sub control circuits include a first control circuit and a second control circuit. The second control circuit is connected to the first control circuit in series so as to perform communication. The first control circuit is configured to: receive first data, the first data including a first parameter and a second parameter, the first parameter corresponding to the first control circuit, the second parameter corresponding to the second control circuit; and transmit the first data to the second control circuit. The second control circuit is configured to: receive the first data from the first control circuit; and delete the first parameter from the first data.

According to another aspect, this specification also discloses a data transmission method performed in a printer. The printer includes a plurality of head units each having a nozzle, a main control circuit, and a plurality of sub control circuits. The plurality of sub control circuits are connected to respective ones of the plurality of head units. One of the plurality of sub control circuits is connected to the main control circuit so as to perform communication. The plurality of sub control circuits include a first control circuit and a second control circuit. The second control circuit is connected to the first control circuit in series so as to perform communication. The data transmission method includes: receiving first data by the first control circuit, the first data including a first parameter and a second parameter, the first parameter corresponding to the first control circuit, the second parameter corresponding to the second control circuit; transmitting the first data from the first control circuit to the second control circuit; receiving the first data by the second control circuit, the first data being transmitted from the first control circuit; and deleting, by the second control circuit, the first parameter from the first data.

According to still another aspect, this specification also discloses a non-transitory computer-readable storage medium storing a set of program instructions executable on a printer. The printer includes a plurality of head units each having a nozzle, a main control circuit, and a plurality of sub control circuits. The plurality of sub control circuits are connected to respective ones of the plurality of head units. One of the plurality of sub control circuits is connected to the main control circuit so as to perform communication. The plurality of sub control circuits include a first control circuit and a second control circuit. The second control circuit is connected to the first control circuit in series so as to perform communication. The set of program instructions, when executed, causes the first control circuit to perform: receiving first data, the first data including a first parameter and a second parameter, the first parameter corresponding to the first control circuit, the second parameter corresponding to the second control circuit; and transmitting the first data to the second control circuit. The set of program instructions, when executed, causes the second control circuit to perform: receiving the first data from the first control circuit; and deleting the first parameter from the first data.

In the printer, the data transmission method, and the storage medium storing a computer program according to one aspect of this disclosure, the second control circuit deletes the first parameter from the first data received from the first control circuit. This reduces the data amount of the first data transmitted from the second control circuit to the sub control circuit at the downstream side, and suppresses an increase in processing time in each control circuit and suppresses a decrease in printing speed.

FIGS. 5A, 5B and 5C are conceptual diagrams showing individual parameter data.

FIG. 6 is a flowchart for explaining a printing process by a main control circuit.

Figure 1:
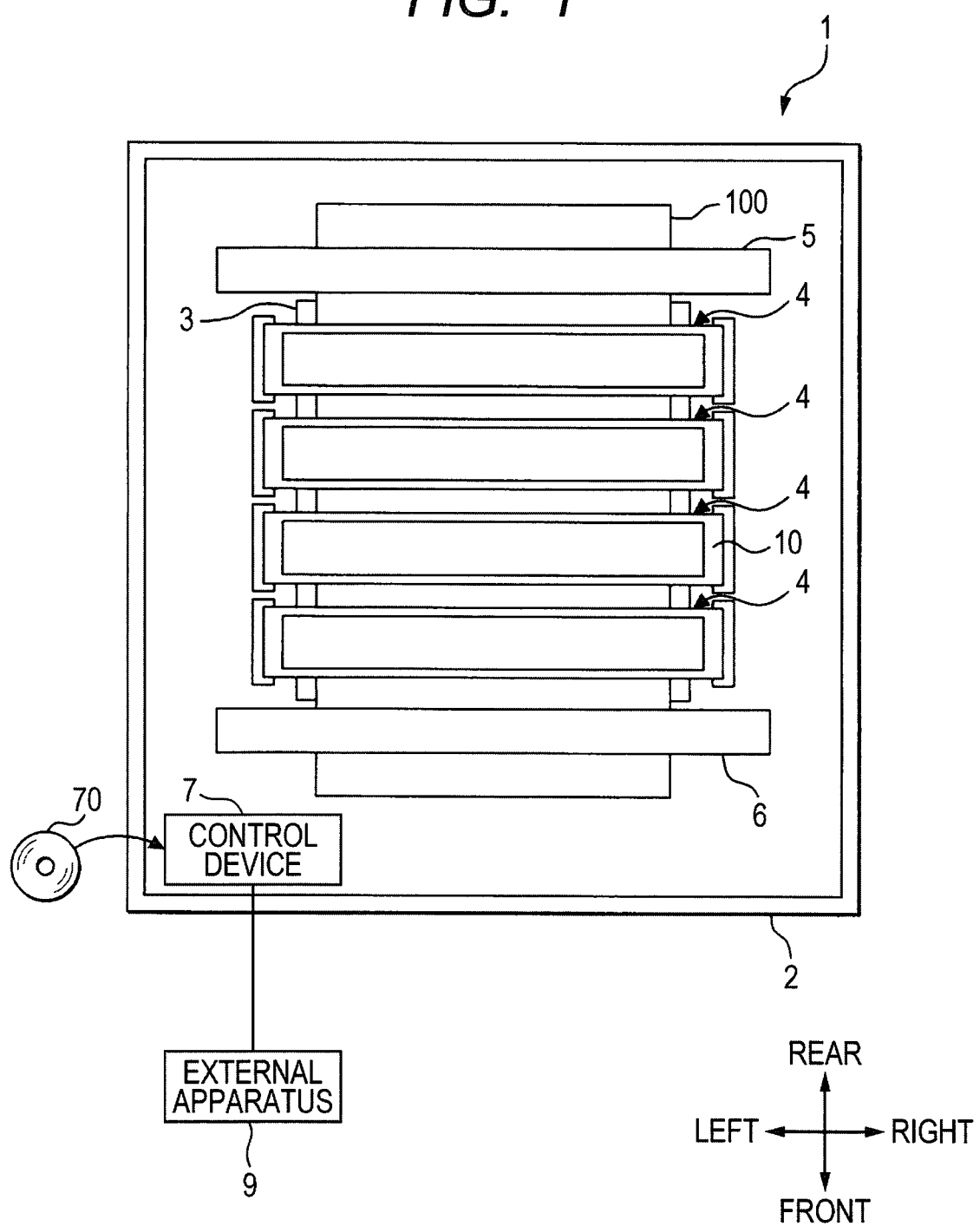
FIG. 1 is a schematic plan view of a printer.

A printer according to a first embodiment will be described below with reference to the drawings. In FIG. 1, a conveyance direction of a recording sheet 100 corresponds to a front-rear direction of a printer 1. A width direction of the recording sheet 100 corresponds to a left-right direction of the printer 1. A direction perpendicular to the front-rear direction and the left-right direction, that is, the direction perpendicular to the drawing surface of FIG. 1 corresponds to an upper-lower direction of the printer 1. The left-right direction corresponds to a first direction, and the front-rear direction corresponds to a second direction.

As shown in FIG. 1, the printer 1 includes a platen 3 accommodated in a case 2, four inkjet heads 4, two conveyance rollers 5 and 6, a control device 7, and so on. The recording sheet 100 passes over the upper surface of the platen 3. The four inkjet heads 4 are arranged in the conveyance direction above the platen 3. Each inkjet head 4 is a so-called line type head. Ink is supplied to the inkjet head 4 from an ink tank (not shown). Ink of different colors is supplied to the four inkjet heads 4.

As shown in FIG. 1, the two conveyance rollers 5 and 6 are arranged at the rear side and the front side of the platen 3, respectively. The two conveyance rollers 5 and 6 are driven by a motor (not shown) to convey the recording sheet 100 on the platen 3 forward.

The control device 7 includes an FPGA, a memory, a RAM, and so on. The memory is rewritable, and is, for example, an EEPROM, an EPROM, a hard disk, and so on. The control device 7 may include a CPU, an ASIC, and so on. A control program is stored in the memory. The control program is installed in the memory from a recording medium 70 such as an optical disc or a portable flash memory. The control program may be downloaded to the memory from a server connected to the printer 1 so as to perform communication. The control device 7 controls the printer 1 based on the control program. The control device 7 is connected to an external apparatus 9 such as a PC so as to perform data communication, and based on print data sent from the external apparatus 9, drives each section of the printer 1 to perform printing.

Figure 2:
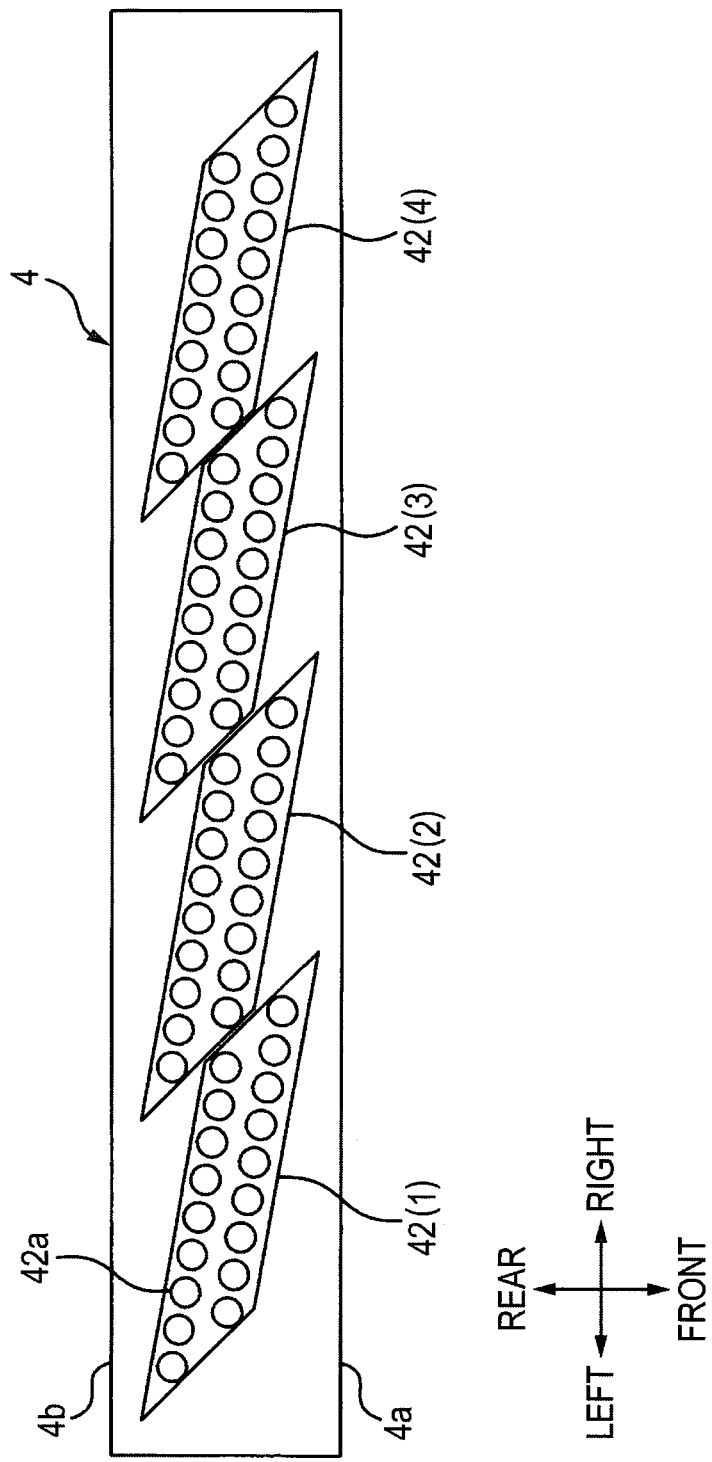
FIG. 2 is a plan view of an inkjet head in which heads are shown for convenience.

As shown in FIG. 2, the inkjet head 4 includes a plurality of heads 42. The head 42 is an example of a head unit. The head 42 has a parallelogram shape extending obliquely to the left and the rear and obliquely to the right and the front in a plan view. The head 42 has a plurality of nozzles 42a. The plurality of heads 42 are arranged in a line in the left-right direction and not arranged in the front-rear direction. The plurality of heads 42 include, for example, a first head 42(1), a second head 42(2) located to the right of the first head, a third head 42(3) located to the right of the second head, a third head 42(3) located to the right of the second head, and a fourth head 42(4) located to the right of the third head 42(3). The distance between a front end 4a and a rear end 4b of the inkjet head 4 is longer than the length of the first head 42(1) in the front-rear direction, the length of the second head 42(2) in the front-rear direction, the length of the third head 42(3) in the front-rear direction, and the length of the fourth head 42(4) in the front-rear direction. The distance between the front end 4a and the rear end 4b of the inkjet head 4 is shorter than twice the length of the first head 42(1) in the front-rear direction, twice the length of the second head 42(2) in the front-rear direction, twice the length of the third head 42(3) in the front-rear direction, and twice the length of the fourth head 42(4) in the front-rear direction. That is, in the inkjet head 4, the first head 42(1) and the second head 42(2) are not shifted in the front-rear direction by the size of the first head 42(1). Further, the second head 42(2) and the third head 42(3) are not shifted in the front-rear direction by the size of the second head 42(1). Further, the third head 42(3) and the fourth head 42(4) are not shifted in the front-rear direction by the size of the third head 42(3). Further, the first head 42(1) and the fourth head 42(4) are not shifted in the front-rear direction by the size of the first head 42(1). In other words, the first head 42(1), the second head 42(2), the third head 42(3), and the fourth head 42(4) are not in a staggered arrangement.

The right end part of the first head 42(1) is located at the front side of the left end part of the second head 42(2). The right end part of the second head 42(2) is located at the front side of the left end part of the third head 42(3). The right end part of the third head 42(3) is located at the front side of the left end part of the fourth head 42(4). The left-right positions of the nozzles 42a located at the right end part of the first head 42(1) are substantially the same as the left-right positions of the nozzles 42a located at the left end part of the second head 42(2). That is, the nozzles 42a located at the right end part of the first head 42(1) overlap the nozzles 42a located at the left end part of the second head 42(2) in the front-rear direction.

The left-right positions of the nozzles 42a located at the right end part of the second head 42(2) are substantially the same as the left-right positions of the nozzles 42a located at the left end part of the third head 42(3). That is, the nozzles 42a located at the right end part of the second head 42(2) overlap the nozzles 42a located at the left end part of the third head 42(3) in the front-rear direction. The left-right positions of the nozzles 42a located at the right end part of the third head 42(3) are substantially the same as the left-right positions of the nozzles 42a located at the left end part of the fourth head 42(4). That is, the nozzles 42a located at the right end part of the third head 42(3) overlap the nozzles 42a located at the left end part of the fourth head 42(4) in the front-rear direction.

Figure 3:
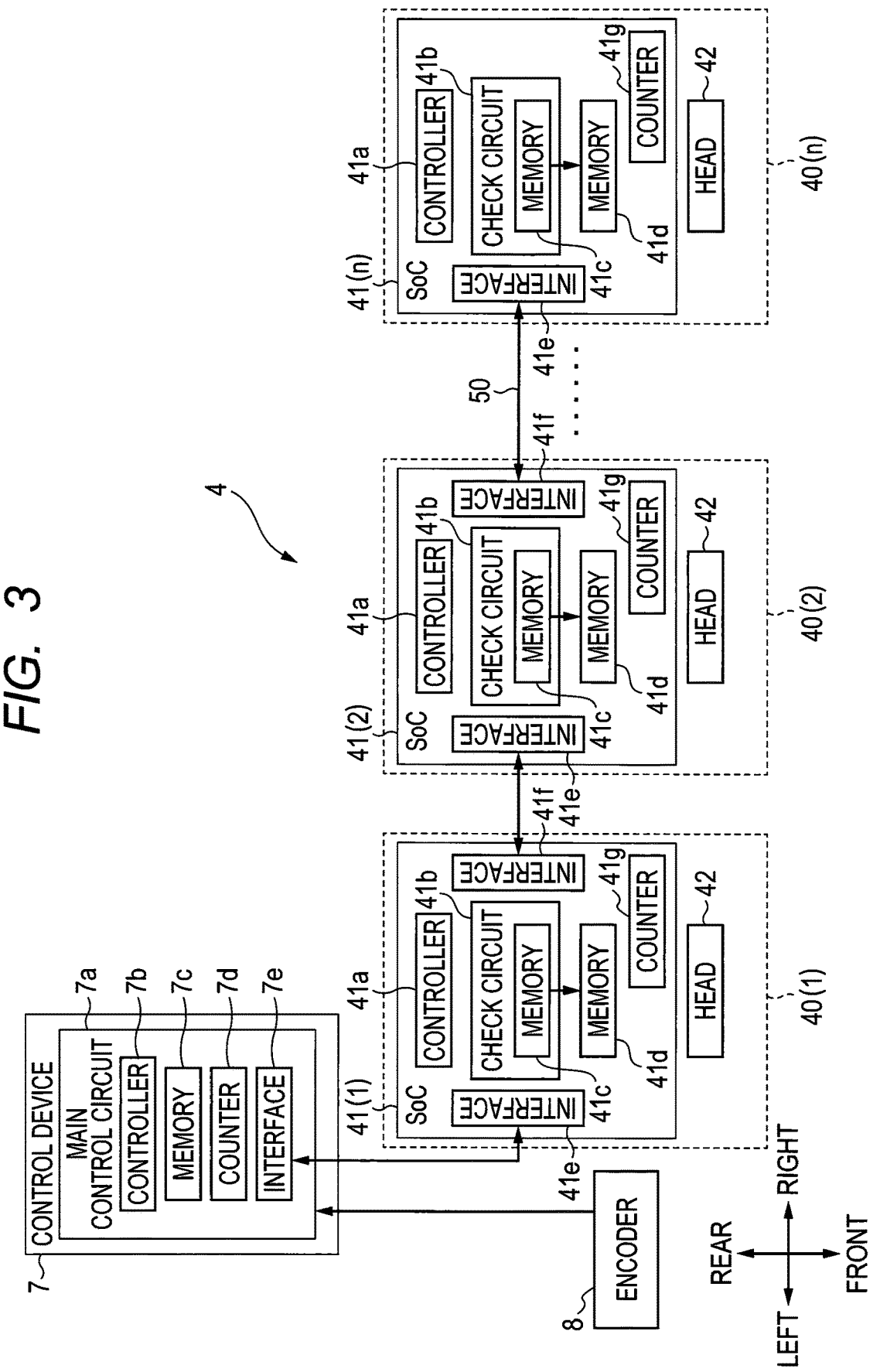
FIG. 3 is a block diagram of a control device, an encoder and the inkjet head.

As shown in FIG. 3, the control device 7 has a main control circuit 7a. The main control circuit 7a includes a controller 7b, a memory 7c, a counter 7d, and an interface (I/F) 7e. The inkjet head 4 has a plurality of head modules 40. The plurality of head modules 40 are arranged in a line in the left-right direction.

The plurality of head modules 40 include, for example, a first head module 40(1), a second head module 40(2), ..., a n-th head module 40(n) (n is a natural number). The first head module 40(1) is located leftmost and the n-th head module 40(n) is located rightmost.

Each of the first head module 40(1) to the n-th head module 40(n) includes an SoC 41 and a head 42. The SoC 41 is an example of a sub control circuit. The SoC 41 includes a controller 41a, a check circuit 41b, a memory 41d, an upstream interface 41e, a downstream interface 41f, and a counter 41g. The check circuit 41b checks whether received data includes a common parameter or an individual parameter corresponding to the SoC 41 itself, and stores the common parameter or the individual parameter corresponding to the SoC 41 itself in the memory 41c. The memory 41c is, for example, a volatile memory or a non-volatile memory. Communication standards for the upstream interface 41e and the downstream interface 41f include, for example, PCIe, UART, Ethernet, and USB.

The controller 41a controls the operation of the SoC 41. The controller 41a may include, for example, a CPU, or may include a logic circuit such as an ASIC. The memory 41d is a rewritable non-volatile memory such as EPROM or EEPROM. The counters 7d and 41g are synchronized by, for example, inputting a reset signal from the outside in parallel to each of the counters 7d and 41g. Hereinafter, the SoCs 41 of the head module 40(1) to the n-th head module 40(n) are referred to as SoC 41(1) to SoC 41(n).

Each interface 7e, 41e, 41f is an interface configured to perform two-way communication and connected in series by a communication cable 50. In other words, the interface 7e of the control device 7 is connected to the interface 41e of the SoC 41(1) and the interface 41f of the Soc 41(1) is connected to the interface 41e of the SoC 41(2) so as to perform communication. The interface 7e transmits image data included in print data to the interface 41e of the SoC 41(1). The interface 41f of the SoC 41(1) transmits image data to the interface 41e of the SoC 41(2), and the interface 41f of the SoC 41(2) transmits image data to the interface 41e of the SoC 41(3). In this manner, the image data is sequentially transmitted to the interface 41e of the SoC 41(n).

The image data includes an identifier of each of the SoC 41(1) to the SoC 41(n) and print information associated with each identifier. Each of the controllers 41a of the SoC 41(1) to the SoC 41(n) acquires the print information associated with its own identifier from received image data.

The conveyance rollers 5 and 6 are provided with a motor (not shown), and the motor is provided with an encoder 8. The encoder 8 detects the rotational position or speed of the motor. The rotational position or speed of the motor corresponds to the front-rear position of the recording sheet 100. Each time the encoder 8 detects the rotational position or speed corresponding to a print position (a position on the recording sheet 100 at which printing of one line should be performed), the encoder 8 transmits a synchronization signal to the main control circuit 7a.

The main control circuit 7a transmits a synchronization signal to the interface 41e of the SoC 41(1) as necessary. The interface 41f of the SoC 41(1) transmits the synchronization signal to the interface 41e of the SoC 41(2), and the interface 41f of the SoC 41(2) transmits the synchronization signal to the interface 41e of the SoC 41(3). In this way, the synchronization signal is sequentially transmitted up to the interface 41e of the SoC 41(n). Each of the SoC 41(1) to SoC 41(n) refers to the counter 41g, drives the head 42 at the time indicated by the received synchronization signal, and ejects ink from the nozzles 42a. The common parameter described later includes the synchronization signal.

Figure 4A:
FIGS. 4A, 4B, 4C and 4D are conceptual diagrams showing an example of a data structure.
Figure 4B:
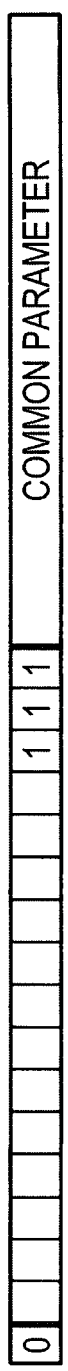
Figure 4C:
Figure 4D:
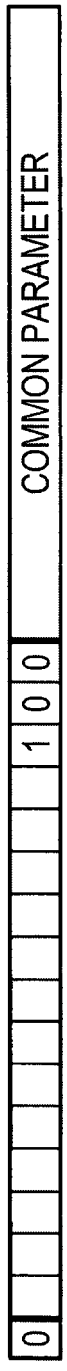

A case where the inkjet head 4 includes three SoC 41(1) to SoC 41(3), that is, a case of n=3 will be described with reference to FIGS. 4A to 4D. The image data includes parameter data. FIG. 4A shows the structure of parameter data of one packet, FIG. 4B shows common parameter data received by the SoC 41(1), FIG. 4C shows common parameter data received by the SoC 41(2), and FIG. 4D shows common parameter data received by the SoC 41(3).

In this embodiment, there is only one type of common parameter. As described above, the plurality of heads 42 are arranged in a line in the left-right direction and not arranged in the front-rear direction. Thus, a plurality of types of common parameters corresponding to the front-rear positions of the heads 42 are not necessary.

As shown in FIG. 4A, one packet of parameter data includes a flag bit, header bits, and data bits. Here, one packet is a unit composed of a set of a flag bit, header bits and data bits. The flag bit indicates the type of parameter indicated by the parameter data, such as a common parameter or an individual parameter. The flag bit is, for example, 1 bit, where "0" indicates a common parameter and "1" indicates an individual parameter.

The common parameter is a parameter common to each SoC 41, and includes, for example, a synchronization time point at which each head 42 ejects ink. The individual parameter is a parameter unique to each SoC 41, and includes, for example, information for specifying the nozzle 42a to be used for printing, for example, from the nozzle 42a of the first head 42(1) and the nozzle 42a of the second head 42(2) that overlap in the front-rear direction.

The header bits store header information that identifies each SoC 41(1) to 41(3). The header bits include multiple bits, for example 15 bits. In the header bits, the bits on the right side indicate lower bits and the bits on the left side indicate higher bits. Hereinafter, the least significant bit is referred to as the first bit, and the bits are sequentially referred to as the second bit, the third bit, . . . , and the 15th bit toward the higher bits. The header bits may be 14 bits or less, or 16 bits or more.

The first bit stores the first header information corresponding to the SoC 41(1). If "1" is stored in the first bit, it means that the common parameter is not acquired by the SoC 41(1), or indicates that the first header information exists. If "0" is stored in the first bit, that is, if the first header information is changed or deleted, it means that the common parameter is acquired by the SoC 41(1).

The second bit stores the second header information corresponding to the SoC 41(2). If "1" is stored in the second bit, it means that the common parameter is not acquired by the SoC 41(2), or means that the second header information exists. If "0" is stored in the second bit, that is, if the second header information is changed or deleted, it means that the common parameter is acquired by the SoC 41(2).

The third bit indicates the third header information corresponding to the SoC 41(3). If "1" is stored in the third bit, it means that the common parameter is not acquired by the SoC 41(3) or the third header information exists. If "0" is stored in the third bit, that is, if the third header information is changed or deleted, it means that the common parameter is acquired by the SoC 41(3). Hereinafter, the process of changing or deleting the header information corresponding to the SoC 41 itself is also referred to as a header information process.

As shown in FIGS. 4B to 4D, "0" is stored in the flag bit of the common parameter data. As shown in FIG. 4B, the SoC 41(1) receives, from the main control circuit 7a, common parameter data in which "1" is stored in the first, second, and third bits, and no data is stored in the fourth to 15th bits. In the present embodiment, the case of n=3 is described, but when n=15, "1" is also stored in the fourth to 15th bits.

The SoC 41(1) stores the common parameter in the memory 41c, changes the first bit "1" to "0", that is, changes information in the first bit from information indicating that the common parameter is not acquired by the SoC 41(1) to information indicating that the common parameter is acquired by the SoC 41(1), and transmits the common parameter data to the SoC 41(2) (see FIG. 4C). The controller 41a of the SoC 41(1) accesses the memory 41c and stores the common parameter in the memory 41d.

The SoC 41(2) stores the common parameter in the memory 41c and changes the second bit "1" to "0", that is, changes the information in the second bit from information indicating that the common parameter is not acquired by the SoC 41(2) to information indicating that the common parameter is acquired by the SoC 41(2), and transmits the common parameter data to the SoC 41(3) (see FIG. 4D). The controller 41a of the SoC 41(2) accesses the memory 41c and stores the common parameter in the memory 41d.

The SoC 41(3) stores the common parameter in the memory 41c, and changes the third bit "1" to "0", that is changes the information in the third bit from information indicating that the common parameter is not acquired by the SoC 41(3) to information indicating that the common parameter is acquired by the SoC 41(3). The controller 41a of the SoC 41(3) accesses the memory 41c and stores the common parameter in the memory 41d.

The controller 41a of the SoC 41(3) notifies the main control circuit 7a that acquisition of the common parameter has been completed. If the main control circuit 7a does not receive the acquisition completion notification of the common parameter from the SoC 41(3) within a particular time, the main control circuit 7a may retransmit the common parameter data to the SoC 41(1) to the SoC 41(3).

When the common parameter data is received and "1" is stored in the first bit of the header bit, the SoC 41(2) determines that the upstream SoC 41, that is, the SoC 41(1) is abnormal and executes a common parameter retransmission process for retransmitting the common parameter to the SoC 41(1). When the common parameter data is received and "1" is stored in the second bit of the header bit, the SoC 41(3) determines that the upstream SoC 41, that is, the SoC 41(2) is abnormal and executes the common parameter retransmission process for retransmitting the common parameter to the SoC 41(2).

As described above, when the main control circuit 7a transmits the common parameter data to the SoC 41(1), the SoC 41(k) (k=1, 2, . . . , n−1) having received the common parameter data changes the k-th bit of the header bit from "1" to "0" and transmits the common parameter data to the SoC 41(k+1).

FIG. 5A shows three packets of individual parameter data received by the SoC 41(1), FIG. 5B shows three packets of individual parameter data received by the SoC 41(2), and FIG. 5C shows two packets of individual parameter data received by the SoC 41(3).

As shown in FIG. 5A, the three packets of individual parameter data include an individual parameter 1, an individual parameter 2, and an individual parameter 3. The individual parameter data 1 is a parameter unique to the SoC 41(1), the individual parameter data 2 is a parameter unique to the SoC 41(2), and the individual parameter data 3 is a parameter unique to the SoC 41(3). Hereinafter, the individual parameter data including the individual parameter 1 will be referred to as first individual parameter data, the individual parameter data including individual parameter 2 will be referred to as second individual parameter data, and the individual parameter data including individual parameter 3 will be referred to as third individual parameter data. When there is no need to distinguish between the three individual parameter data, they are simply referred to as individual parameter data.

The first bit of the first individual parameter data stores the first header information corresponding to the SoC 41(1). If "1" is stored in the first bit, it means that the individual parameter 1 is not acquired by the SoC 41(1) or the first header information exists. If "0" is stored in the first bit, that is, if the first header information is changed or deleted, it means that the individual parameter 1 has been acquired by the SoC 41(1).

The second bit of the second individual parameter data stores the second header information corresponding to the SoC 41(2). If "1" is stored in the second bit, that is, if the second header information exists, it means that the individual parameter 2 is not acquired by the SoC 41(2) or that the second header information exists. If "0" is stored in the second bit, that is, the second header information is changed or deleted, it means that the individual parameter 2 has been acquired by the SoC 41(2).

The third bit of the third individual parameter data stores the third header information corresponding to the SoC 41(3). If "1" is stored in the third bit, it means that the individual parameter 3 is not acquired by the SoC 41(3) or the third header information exists. If "0" is stored in the third bit, that is, if the third header information is changed or deleted, it means that the individual parameter 3 has been acquired by the SoC 41(3).

As shown in FIG. 5A, "1" is stored in the flag bit of each of the first to third individual parameter data. The SoC 41(1) receives the first to third individual parameter data from the main control circuit 7a. In the first individual parameter data, "1" is stored in the first bit of the header bits, and "0" is stored in the second and third bits. In the second individual parameter data, "1" is stored in the second bit of the header bits, and "0" is stored in the first and third bits. In the third individual parameter data, "1" is stored in the third bit of the header bits, and "0" is stored in the first and second bits.

The SoC 41(1) selects the individual parameter data in which "1" is stored in the first bit, that is, the first individual parameter data, stores the individual parameter 1 stored in the first individual parameter data in the memory 41c, changes the first bit "1" to "0", that is, changes the information in the first bit from information indicating that the individual parameter is not acquired by the SoC 41(1) to information indicating that the individual parameter is acquired by the SoC 41(1), and transmits the first to third individual parameter data to the SoC 41(2) (see FIG. 5B). The controller 41a of the SoC 41(1) accesses the memory 41c and stores the individual parameter 1 in the memory 41d.

The SoC 41(2) receives the first to third individual parameter data transmitted from the SoC 41(1). The SoC 41(2) selects the individual parameter data in which "1" is stored in the second bit, that is, the second individual parameter data, from the received first to third individual parameter data, stores the individual parameter 2 stored in the second individual parameter data in the memory 41c, and changes the second bit "1" to "0", that is, changes the information in the second bit from information indicating that the individual parameter is not acquired by the SoC 41(2) to information indicating that the individual parameter is acquired by the SoC 41(2). When the first bit of the first individual parameter data is "0", the SoC 41(2) deletes the first individual parameter data and transmits the second and third individual parameter data to the SoC 41(3) (see FIG. 5C). The controller 41a of the SoC 41(2) accesses the memory 41c and stores the individual parameter 2 in the memory 41d.

The SoC 41(3) receives the second and third individual parameter data transmitted from the SoC 41(2). The SoC 41(3) selects the individual parameter data in which "1" is stored in the third bit, that is, the third individual parameter data, from the received second and third individual parameter data, stores the individual parameter 3 stored in the third individual parameter data in the memory 41c, and changes the third bit "1" to "0", that is, changes the information in the third bit from information indicating that the individual parameter is not acquired by the SoC 41(3) to information indicating that the individual parameter is acquired by the SoC 41(3). The controller 41a of the SoC 41(3) accesses the memory 41c and stores the individual parameter 3 in the memory 41d. The SoC 41(3) may or may not delete the second individual parameter data when the second bit of the second individual parameter data is "0".

The controller 41a of the SoC 41(3) may notify the main control circuit 7a that acquisition of the individual parameter 3 has been completed. If the main control circuit 7a does not receive the acquisition completion notification of the individual parameter 3 from the SoC 41(3) within a particular time, the main control circuit 7a may retransmit the first to third individual parameter data to the SoC 41(1) to the SoC 41(3). The controller 41a of the SoC 41(3) does not have to notify the main control circuit 7a that the acquisition of the individual parameter 3 has been completed.

As described above, when the main control circuit 7a transmits, to the SoC 41(1), n pieces of individual parameter data respectively corresponding to n SoCs 41, the downstream SoC 41(k) (k=2 to n−1) deletes the (k−1)-th individual parameter data and transmits the k-th to n-th individual parameter data to the SoC 41(k+1) if the (k−1)-th bit of the (k−1)-th individual parameter data is "0". The most downstream SoC 41(n) may or may not delete the (n−1)-th individual parameter data if the (n−1)-th bit of the (n−1)-th individual parameter data is "0". The controller 41a of the SoC 41(n) may or may not notify the main control circuit 7a that acquisition of the n-th individual parameter has been completed.

A printing process by the main control circuit 7a will be described with reference to FIG. 6. The main control circuit 7a determines whether a print job has been received from the external apparatus 9 (S1). If no print job has been received from the external apparatus 9 (S1: NO), the main control circuit 7a returns the processing to step S1. When a print job has been received from the external apparatus 9 (S1: YES), the main control circuit 7a determines whether a common parameter or an individual parameter has been set in each SoC 41 (S2).

If a common parameter or an individual parameter has not been set in each SoC 41 (S2: NO), the main control circuit 7a transmits common parameter data or individual parameter data to the SoC 41(1) (S3). The main control circuit 7a transmits image data to the SoC 41(1) and starts printing (S4). The image data is not shown in the drawings. The image data includes header bits shown in FIGS. 4A to 5C. If a common parameter or an individual parameter has already been set in each SoC 41 (S2: YES), the main control circuit 7a advances the processing to step S4.

The main control circuit 7a determines whether an event to change the common parameter or the individual parameter has occurred (S5). The event may be, for example, that correction of the timing of synchronization is performed or correction of information for specifying the nozzle 42a to be used for printing is performed. If an event to change the common parameter or the individual parameter has occurred (S5: YES), the main control circuit 7a transmits the changed common parameter data or individual parameter data to the SoC 41(1) (S6). In step S6, the transmission of the parameter data is performed, for example, in a period from the end of printing of one line to the start of printing of the next line, that is, a period in which ink is not ejected.

The main control circuit 7a determines whether printing has ended (S7). If printing has not ended (S7: NO), the main control circuit 7a returns the processing to step S5. If the printing has ended (S7: YES), the main control circuit 7a ends the printing process. In step S5, if an event to change the common parameter or the individual parameter has not occurred (S5: NO), the main control circuit 7a advances the processing to step S7.

Figure 7:
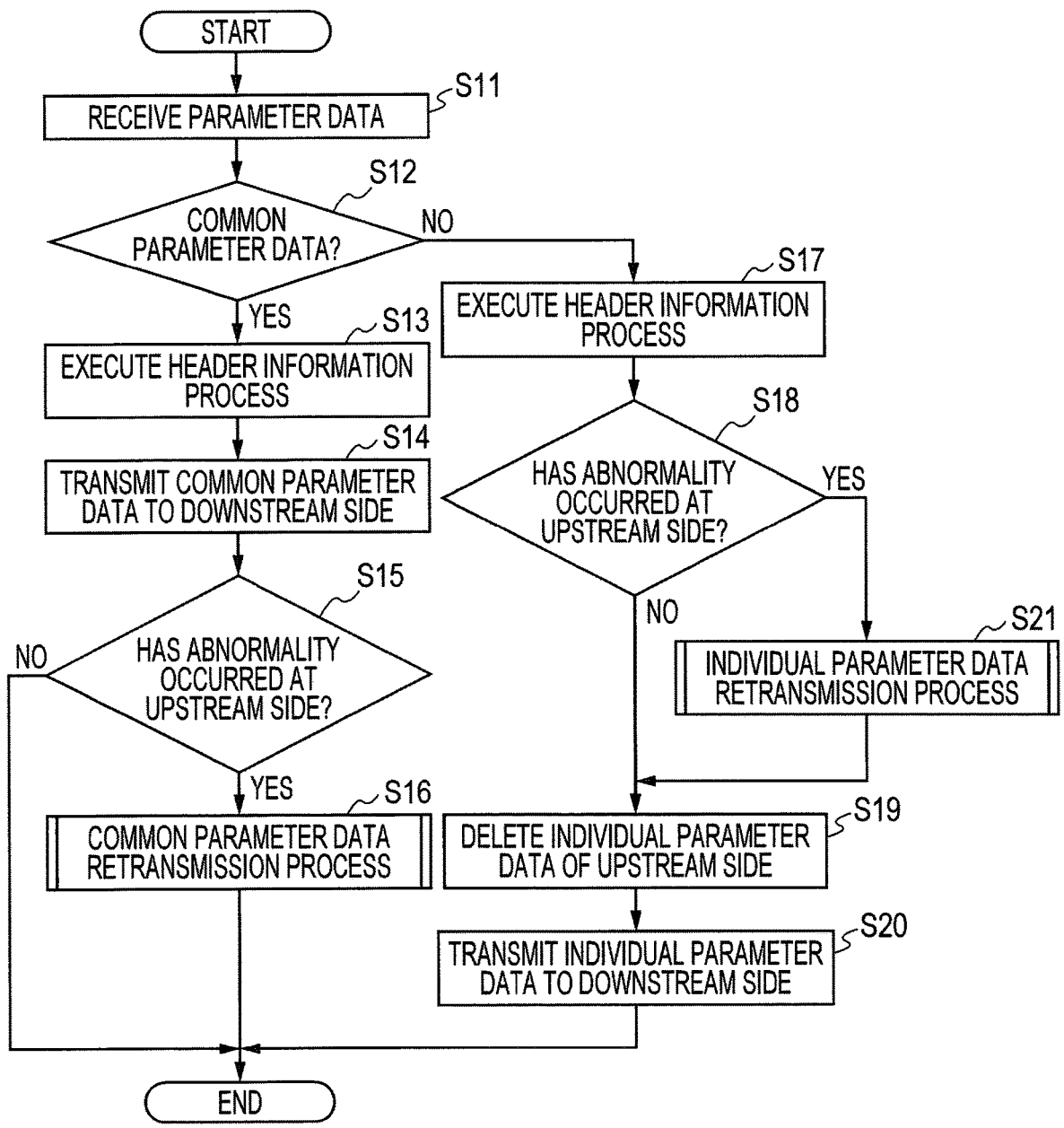
FIG. 7 is a flowchart for explaining a parameter data transmission/reception process by an SoC.

A parameter data transmission/reception process by the SoC 41 will be described with reference to FIG. 7. The SoC 41 receives common parameter data or individual parameter data (S11). The SoC 41 determines whether the received parameter data is common parameter data (S12). If the received parameter data is common parameter data (S12: YES), the SoC 41 executes the header information process to change the header information corresponding to itself (S13). SoC 41(k) (k=1, 2, ..., n−1) changes "1" of the k-th bit to "0". The SoC 41 transmits, to the downstream SoC 41, the common parameter data in which its own header information is changed (S14).

The SoC 41 determines whether an abnormality has occurred in the upstream SoC 41 (S15). For example, the SoC 41(k) (k=1, 2, ..., n−1) determines that an abnormality has occurred in the upstream SoC 41 when the (k−1)-th bit is "1", that is, when it is indicated that the common parameter is not acquired by the SoC 41(k−1). The SoC 41(k) determines that an abnormality has not occurred in the upstream SoC 41 when the (k−1)-th bit is "0", that is, when it is indicated that the common parameter is acquired by the SoC 41(k−1).

In response to determining that an abnormality has occurred in the upstream SoC 41 (S15: YES), the SoC 41 executes a common parameter data retransmission process (S16) and ends the parameter data transmission/reception process. The common parameter data retransmission process will be described later.

In response to determining in step S15 that no abnormality has occurred in the upstream SoC 41 (S15: NO), the SoC 41 ends the parameter data transmission/reception process. In response to determining in step S12 that the received parameter data is not common parameter data (S12: NO), that is, if the received parameter data is individual parameter data, the SoC 41 executes the header information process (S17), and determines whether an abnormality has occurred in the upstream SoC 41 (S18).

For example, the SoC 41(k) (k=2, 3, ..., n−1) determines that no abnormality has occurred when "0" is stored in the (k−1)-th bit of the received (k−1)-th individual parameter data, that is, when the upstream SoC 41 has already received the individual parameter data corresponding to itself. The SoC 41(k) determines that an abnormality has occurred when "1" is stored in the (k−1)-th bit, that is, when the upstream SoC 41 has not received the individual parameter data corresponding to itself.

In response to determining that no abnormality has occurred in the upstream SoC 41 (S18: NO), the SoC 41 deletes the individual parameter data corresponding to the upstream SoC 41 (S19), transmits the remaining individual parameter data to the downstream side (S20), and ends the parameter data transmission/reception process.

In response to determining that an abnormality has occurred in the upstream SoC 41 (S18: YES), the SoC 41 executes an individual parameter data retransmission process (S21), and advances the processing to step S19. The individual parameter data retransmission process will be described later.

Figure 8:
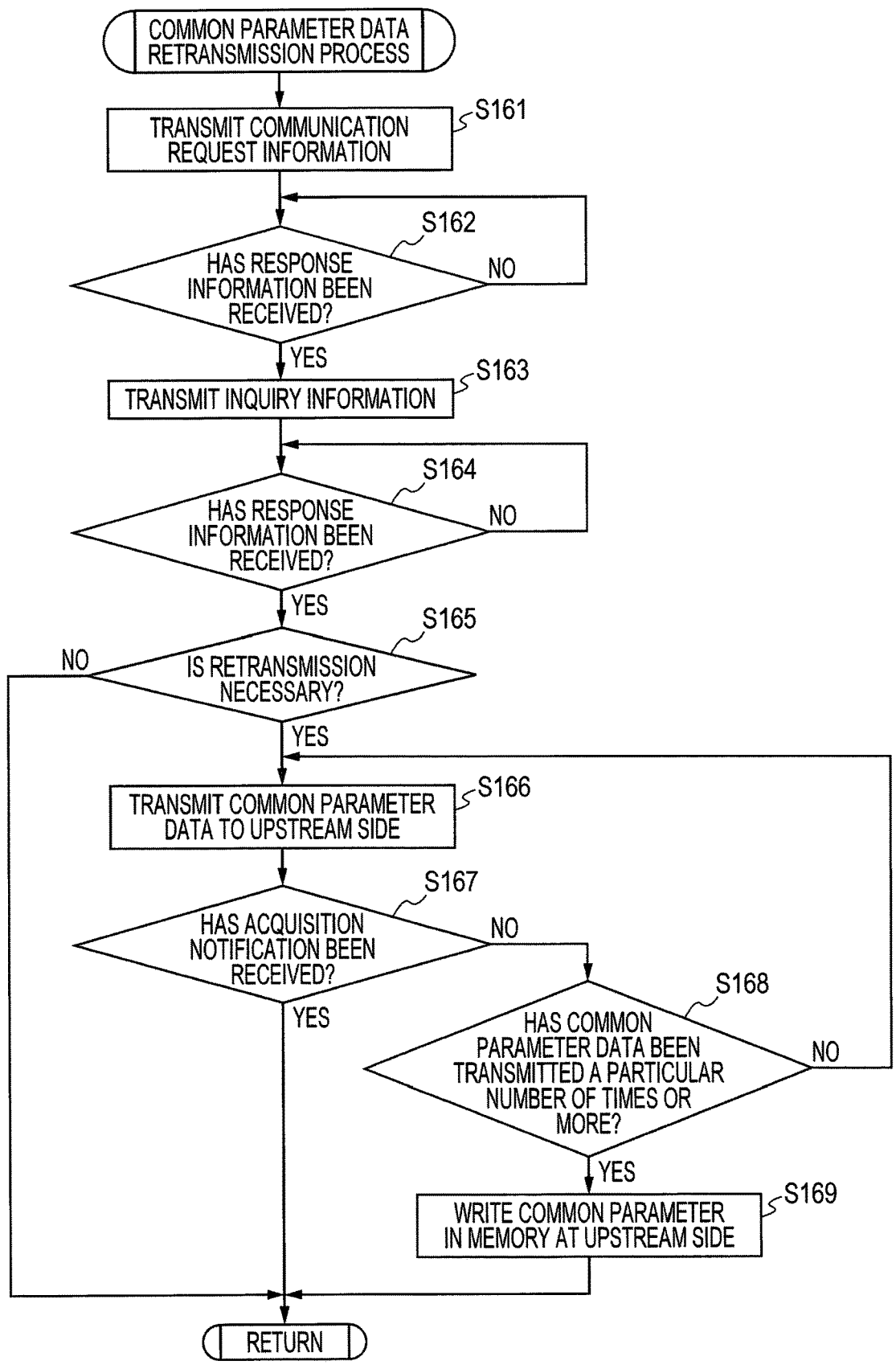
FIG. 8 is a flowchart for explaining a common parameter data retransmission process by an SoC.

The common parameter data retransmission process by the SoC 41 will be described with reference to FIG. 8. In response to determining that an abnormality has occurred in the upstream SoC 41 (S15: YES), the SoC 41 transmits information requesting communication to the upstream SoC 41 (S161), and determines whether information indicating a response from the upstream SoC 41 has been received (S162). If information indicating a response has not been received (S162: NO), the SoC 41 returns the processing to step S162.

In response to receiving information indicating a response (S162: YES), that is, when communication with the upstream SoC 41 is established, the SoC 41 transmits, to the upstream SoC 41, information (inquiry information) for inquiring whether common parameter data has been acquired (S163). The SoC 41 determines whether response information to the inquiry information has been received from the upstream SoC 41 (S164). If response information has not been received from the upstream SoC 41 (S164: NO), the SoC 41 returns the processing to step S164.

In response to receiving response information from the upstream SoC 41 (S164: YES), the SoC 41 determines, based on the response information, whether it is necessary to retransmit the common parameter data to the upstream SoC 41 (S165). If the response information indicates that the upstream SoC 41 has not acquired the common parameter data, the SoC 41 determines that retransmission of the common parameter data is necessary. If the response information indicates that the upstream SoC 41 has acquired the common parameter data, the SoC 41 determines that retransmission of the common parameter data is unnecessary. In response to determining that it is unnecessary to retransmit the common parameter data to the upstream SoC 41 (S165: NO), the SoC 41 returns to the parameter data transmission/reception process. That is, the common parameter data retransmission process ends.

In response to determining that the common parameter data needs to be retransmitted to the upstream SoC 41 (S165: YES), the SoC 41 transmits the common parameter data to the upstream SoC 41 (S166) and determines whether an acquisition notification indicating that the common parameter data has been acquired has been received from the upstream SoC 41 (S167). If the acquisition notification has been received (S167: YES), the SoC 41 returns to the parameter data transmission/reception process. That is, the common parameter data retransmission process ends.

If the acquisition notification has not been received (S167: NO), the SoC 41 determines whether the common parameter data has been transmitted to the upstream SoC 41 a particular number of times or more (S168). If the data has not been transmitted the particular number of times or more (S168: NO), the SoC 41 returns the processing to step S166. The SoC 41 has a counter (not shown) that counts the number of times the common parameter data has been transmitted to the upstream SoC 41, and determines whether the data has been transmitted the particular number of times or more by referring to the counter. The SoC 41 increments the counter by one each time the SoC 41 transmits the common parameter data to the upstream SoC 41.

If the data has been transmitted the particular number of times or more (S168: YES), the SoC 41 accesses the memory 41d of the upstream SoC 41, writes the common parameter (S169), and returns to the parameter data transmission/reception process. In order to minimize communication between the head modules 40, data is normally delivered between the memories 41c, and writing to the upstream side memory 41d is executed by the upstream SoC 41. However, when the common parameter is not written by the upstream SoC 41 due to an error and so on, the downstream SoC 41 writes the common parameter to the upstream side memory 41d.

Figure 9:
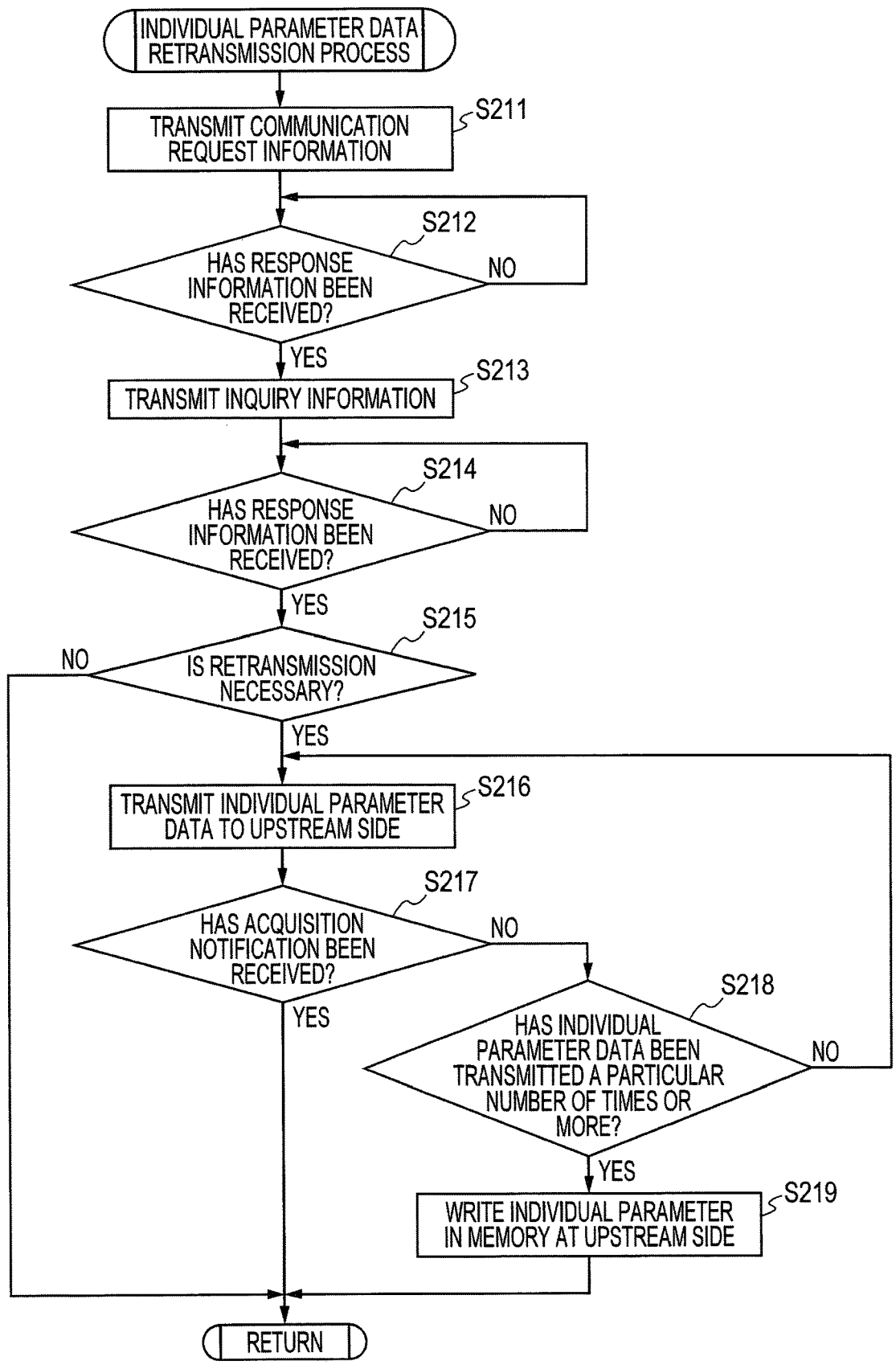
FIG. 9 is a flowchart for explaining an individual parameter data retransmission process by an SoC.

The individual parameter data retransmission process by the SoC 41 will be described with reference to FIG. 9. In response to determining that an abnormality has occurred in the upstream SoC 41 (S18: YES, see FIG. 7), the SoC 41 transmits information requesting communication to the upstream SoC 41 (S211), and determines whether information indicating a response has been received from the upstream SoC 41 (S212). If information indicating a response has not been received (S212: NO), the SoC 41 returns the processing to step S212.

In response to receiving information indicating a response (S212: YES), that is, when communication with the upstream SoC 41 is established, the SoC 41 transmits, to the upstream SoC 41, information (inquiry information) for inquiring whether individual parameter data corresponding to the upstream SoC 41 has been acquired (S213). The SoC 41 determines whether response information to the inquiry information has been received from the upstream SoC 41 (S214). If response information has not been received from the upstream SoC 41 (S214: NO), the SoC 41 returns the processing to step S214.

If response information has been received from the upstream SoC 41 (S214: YES), the SoC 41 determines, based on the response information, whether it is necessary to retransmit to the upstream SoC 41 the individual parameter data corresponding to the upstream SoC 41 (S215). When the response information indicates that the upstream SoC 41 has not acquired the individual parameter data, the SoC 41 determines that retransmission of the individual parameter data corresponding to the upstream SoC 41 is necessary. When the response information indicates that the upstream SoC 41 has acquired individual parameter data, the SoC 41 determines that retransmission of the individual parameter data corresponding to the upstream SoC 41 is unnecessary.

In response to determining that the individual parameter data corresponding to the upstream SoC 41 needs to be retransmitted to the upstream SoC 41 (S215: YES), the SoC 41 transmits the individual parameter data corresponding to the upstream SoC 41 to the upstream SoC 41 (S216), and determines whether an acquisition notification indicating that the individual parameter data has been acquired has been received from the upstream SoC 41 (S217). If the acquisition notification has been received (S217: YES), the SoC 41 returns to the parameter data transmission/reception process.

If the acquisition notification has not been received (S217: NO), the SoC 41 determines whether the individual parameter data corresponding to the upstream SoC 41 has been transmitted to the upstream SoC 41 a particular number of times or more (S218). If the data has not been transmitted the particular number of times or more (S218: NO), the SoC 41 returns the processing to step S216. The SoC 41 has a counter (not shown) that counts the number of times the individual parameter data has been transmitted to the upstream SoC 41 and determines whether the data has been transmitted the particular number of times or more by referring to the counter. The SoC 41 increments the counter by one each time the SoC 41 transmits the individual parameter data to the upstream SoC 41.

If the data has been transmitted the particular number of times or more (S218: YES), the SoC 41 accesses the memory 41d of the upstream SoC 41, writes the individual parameter corresponding to the upstream SoC 41 (S219), and returns to the parameter data transmission/reception process. In order to minimize communication between the head modules 40, data is normally delivered between the memories 41c, and writing to the upstream side memory 41d is executed by the upstream SoC 41. However, when the individual parameter is not written by the upstream SoC 41, the downstream SoC 41 writes the individual parameter to the upstream side memory 41d.

In the printer according to the first embodiment, the SoC 41 deletes individual parameter data corresponding to the upstream SoC 41 from a plurality of individual parameter data received from the upstream SoC 41. Thus, the amount of data transmitted from the SoC 41 to the downstream SoC 41 is reduced, an increase in processing time in each SoC 41 is suppressed, and a decrease in printing speed is suppressed.

Figure 10:
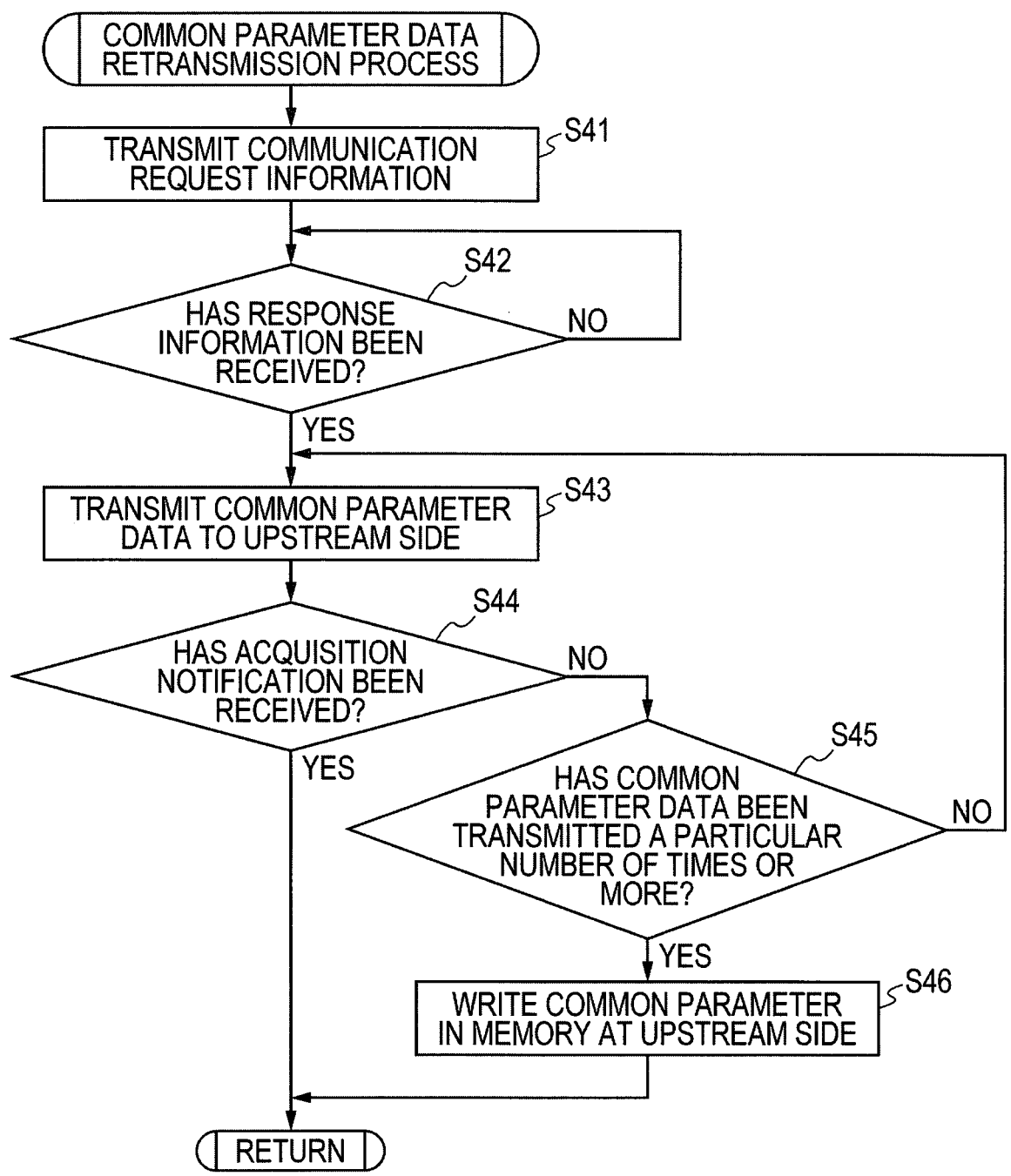
FIG. 10 is a flowchart for explaining a common parameter data retransmission process by an SoC.

A printer according to a second embodiment will be described below with reference to the drawings. Among the configurations according to the second embodiment, the configurations similar to those of the first embodiment are denoted by the same reference numerals, and detailed description thereof will be omitted. A common parameter data retransmission process by the SoC 41 will be described with reference to FIG. 10.

In response to determining that an abnormality has occurred in the upstream SoC 41 (S15: YES, FIG. 7), the SoC 41 transmits information requesting communication to the upstream SoC 41 (S41), and determines whether information indicating a response has been received from the upstream SoC 41 (S42). If information indicating a response has not been received (S42: NO), the SoC 41 returns the processing to step S42.

In response to receiving information indicating a response (S42: YES), that is, when communication with the upstream SoC 41 is established, the SoC 41 transmits the common parameter data to the upstream SoC 41 (S43), and determines whether an acquisition notification indicating that the common parameter data has been acquired has been received from the upstream SoC 41 (S44). If the acquisition notification has been received (S44: YES), the SoC 41 returns to the parameter data transmission/reception process.

If the acquisition notification has not been received (S44: NO), the SoC 41 determines whether the common parameter data has been transmitted to the upstream SoC 41 a particular number of times or more (S45). If the data has not been transmitted the particular number of times or more (S45: NO), the SoC 41 returns the processing to step S43. The SoC 41 has a counter (not shown) that counts the number of times the common parameter data has been transmitted to the upstream SoC 41 and determines whether the data has been transmitted the particular number of times or more by referring to the counter. The SoC 41 increments the counter by one each time the SoC 41 transmits the common parameter data to the upstream SoC 41.

If the data has been transmitted the particular number of times or more (S45: YES), the SoC 41 accesses the memory 41d of the upstream SoC 41, writes the common parameter (S46), and returns to the parameter data transmission/reception process.

Figure 11:
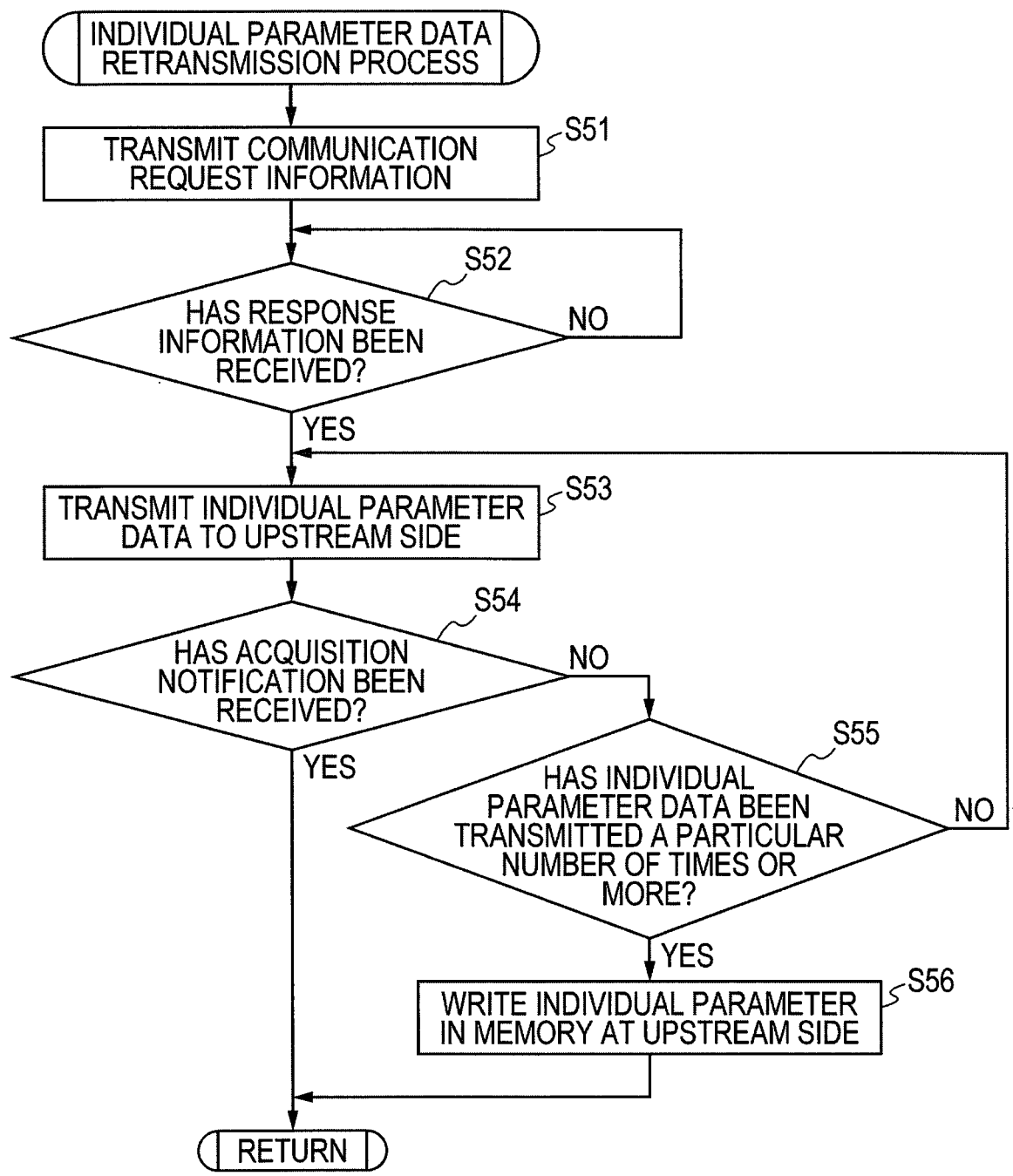
FIG. 11 is a flowchart for explaining an individual parameter data retransmission process by an SoC.

An individual parameter data retransmission process by the SoC 41 will be described with reference to FIG. 11. In response to determining that an abnormality has occurred in the upstream SoC 41 (S18: YES, FIG. 7), the SoC 41 transmits information requesting communication to the upstream SoC 41 (S51), and determines whether information indicating a response has been received from the upstream SoC 41 (S52). If information indicating a response has not been received (S52: NO), the SoC 41 returns the processing to step S52.

In response to receiving information indicating a response (S52: YES), that is, when communication with the upstream SoC 41 is established, the SoC 41 transmits the individual parameter data corresponding to the upstream SoC 41 to the upstream SoC 41 (S53), and determines whether an acquisition notification indicating that the individual parameter data has been acquired has been received from the upstream SoC 41 (S54). If the acquisition notification has been received (S54: YES), the SoC 41 returns to the parameter data transmission/reception process.

If the acquisition notification has not been received (S54: NO), the SoC 41 determines whether the individual parameter data corresponding to the upstream SoC 41 has been transmitted to the upstream SoC 41 a particular number of times or more (S55). If the data has not been transmitted the particular number of times or more (S55: NO), the SoC 41 returns the processing to step S53. If the data has been transmitted the particular number of times or more (S55: YES), the SoC 41 accesses the memory 41d of the upstream SoC 41, writes the individual parameter corresponding to the upstream SoC 41 (S56), and returns to the parameter data transmission/reception process.

Figure 12:
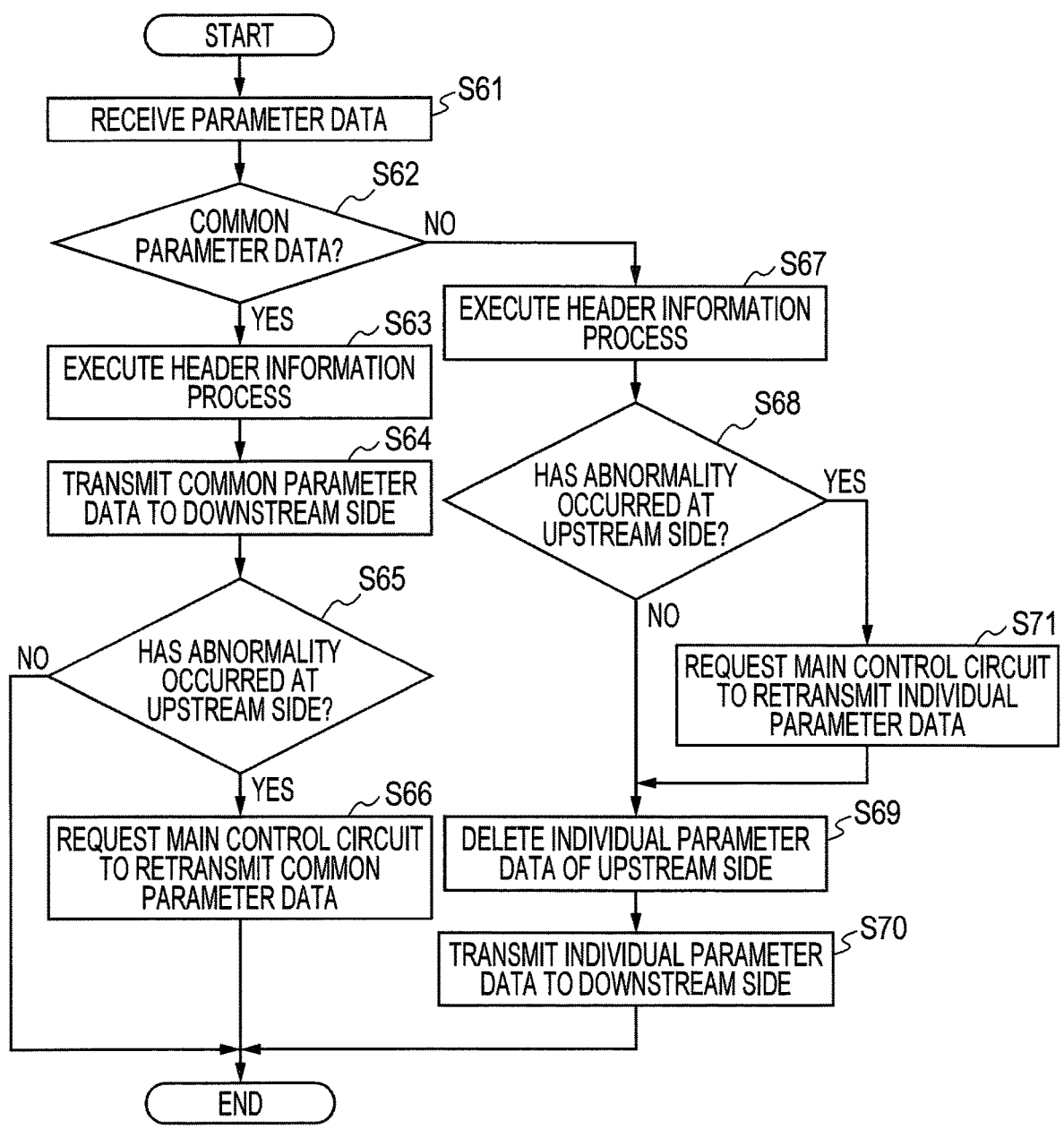
FIG. 12 is a flowchart for explaining a parameter data transmission/reception process by an SoC.

A printer according to a third embodiment will be described below with reference to the drawings. Among the configurations according to the third embodiment, the configurations similar to those of the first embodiment are denoted by the same reference numerals, and detailed description thereof will be omitted. A parameter data transmission/reception process by the SoC 41 will be described with reference to FIG. 12.

The SoC 41 receives common parameter data or individual parameter data (S61). The SoC 41 determines whether the received parameter data is common parameter data (S62). If the received parameter data is common parameter data (S62: YES), the SoC 41 executes header information process to change the header information corresponding to itself (S63). The SoC 41(k) (k=1, 2, . . . , n−1) changes "1" of the k-th bit to "0". The SoC 41 transmits, to the downstream SoC 41, the common parameter data in which its own header information is changed (S64).

The SoC 41 determines whether an abnormality has occurred in the upstream SoC 41 (S65). In response to determining that no abnormality has occurred in the upstream SoC 41 (S65: NO), the SoC 41 ends the parameter data transmission/reception process.

In response to determining that an abnormality has occurred in the upstream SoC 41 (S65: YES), the SoC 41 requests the main control circuit 7a to retransmit the common parameter data to the upstream SoC 41 (S66), and ends the parameter data transmission/reception process.

In response to determining in step S62 that the received parameter data is not common parameter data (S62: NO), that is, if the received parameter data is individual parameter data, the SoC 41 executes the header information process (S67), and determines whether an abnormality has occurred in the upstream SoC 41 (S68).

In response to determining that no abnormality has occurred in the upstream SoC 41 (S68: NO), the SoC 41 deletes the individual parameter data corresponding to the upstream SoC 41 (S69), transmits the remaining individual parameter data to the downstream side (S70), and ends the parameter data transmission/reception process. In response to determining in step S68 that an abnormality has occurred in the upstream SoC 41 (S68: YES), the SoC 41 requests the main control circuit 7a to retransmit the common parameter data to the upstream SoC 41 (S71), and advances the processing to step S69.

Figure 13:
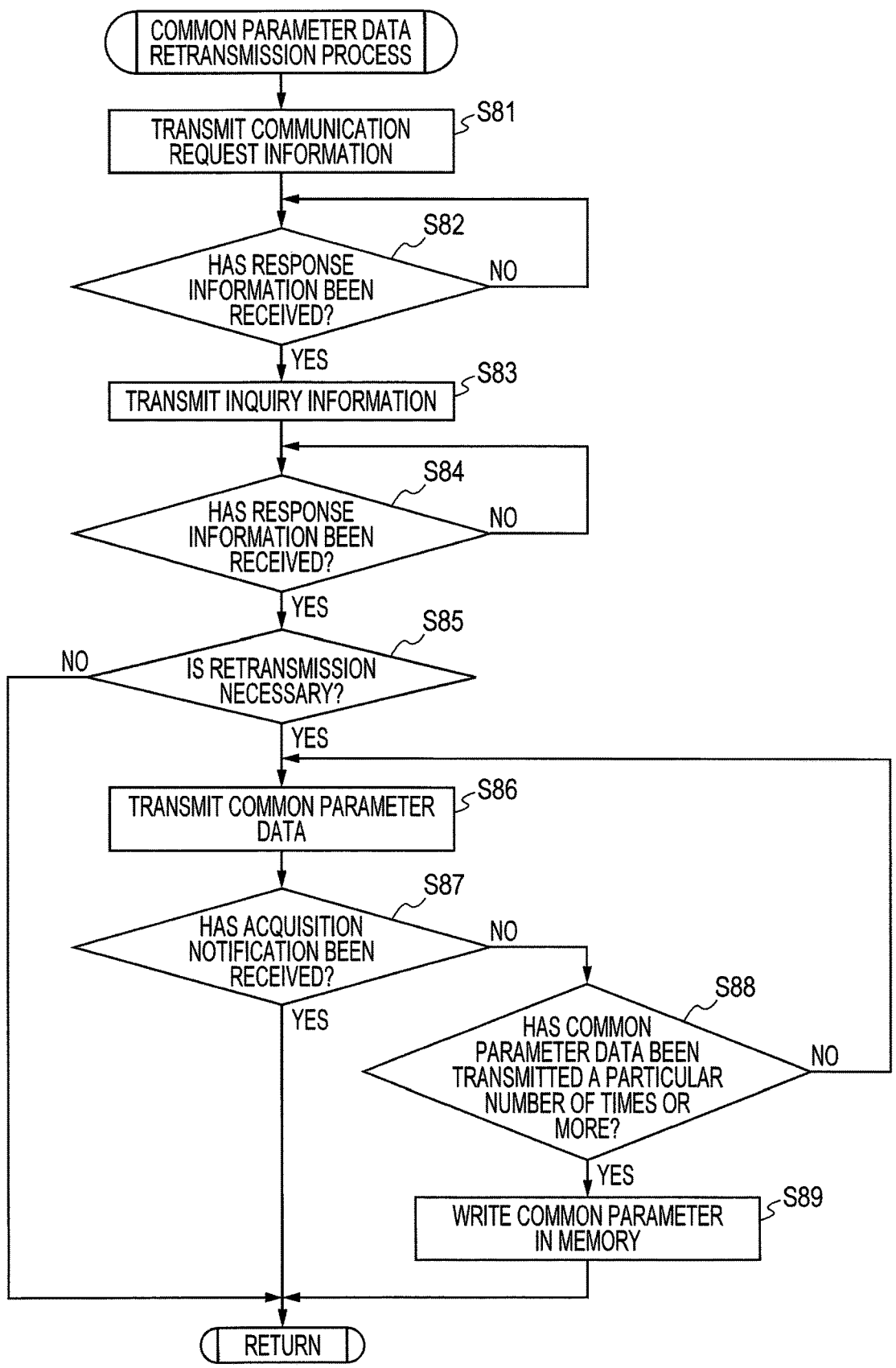
FIG. 13 is a flowchart for explaining a common parameter data retransmission process by the main control circuit.

The common parameter data retransmission process by the main control circuit 7a will be described with reference to FIG. 13. When the main control circuit 7a receives a request to retransmit the common parameter data from the SoC 41 (S66, see FIG. 12), the main control circuit 7a transmits information requesting communication to the upstream SoC 41 (S81), and determines whether information indicating a response has been received from the upstream SoC 41 (S82). If information indicating a response has not been received (S82: NO), the main control circuit 7a returns the processing to step S82.

In response to receiving information indicating a response (S82: YES), that is, when communication with the upstream SoC 41 is established, the main control circuit 7a transmits, to the upstream SoC 41, information (inquiry information) for inquiring whether common parameter data has been acquired (S83). The main control circuit 7a determines whether response information to the inquiry information has been received from the upstream SoC 41 (S84). If response information has not been received from the upstream SoC 41 (S84: NO), the main control circuit 7a returns the processing to step S84.

In response to receiving response information from the upstream SoC 41 (S84: YES), the main control circuit 7a determines whether it is necessary to retransmit the common parameter data to the upstream SoC 41 (S85). When the response information indicates that the upstream SoC 41 has not acquired the common parameter data, the main control circuit 7a determines that retransmission of the common parameter data is necessary. When the response information indicates that the upstream SoC 41 has acquired the common parameter data, the main control circuit 7a determines that retransmission of the common parameter data is unnecessary. In response to determining that retransmission of the common parameter data to the upstream SoC 41 is unnecessary (S85: NO), the main control circuit 7a ends the processing. That is, the common parameter data retransmission process ends.

In response to determining that the common parameter data needs to be retransmitted to the upstream SoC 41 (S85: YES), the main control circuit 7a transmits the common parameter data to the upstream SoC 41 (S86), and determines whether an acquisition notification indicating that the common parameter data has been acquired has been received from the upstream SoC 41 (S87). If the acquisition notification has been received (S87: YES), the main control circuit 7a ends the processing.

If the acquisition notification has not been received (S87: NO), the main control circuit 7a determines whether the common parameter data has been transmitted to the upstream SoC 41 a particular number of times or more (S88). If the data has not been transmitted the particular number of times or more (S88: NO), the main control circuit 7a returns the processing to step S86. The main control circuit 7a has a counter (not shown) that counts the number of times the common parameter data has been transmitted to the upstream SoC 41, and determines whether the data has been transmitted the particular number of times or more by referring to the counter. The main control circuit 7a increments the counter by one each time the main control circuit 7a transmits the common parameter data to the upstream SoC 41.

If the data has been transmitted the particular number of times or more (S88: YES), the main control circuit 7a accesses the memory 41d of the upstream SoC 41, writes the common parameter (S89), and ends the processing.

Figure 14:
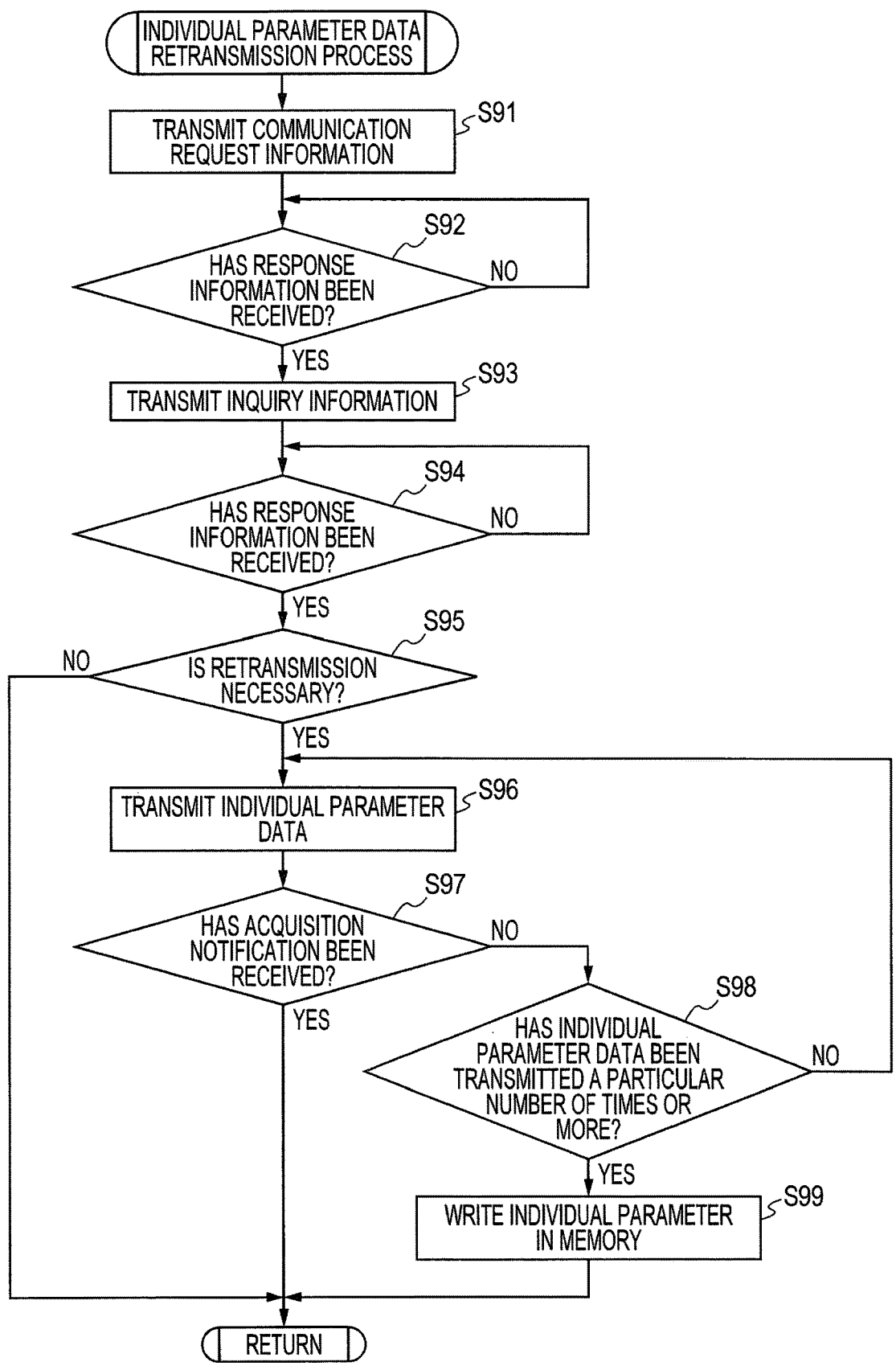
FIG. 14 is a flowchart for explaining an individual parameter data retransmission process by the main control circuit.

The individual parameter data retransmission process by the main control circuit 7a will be described with reference to FIG. 14. When the main control circuit 7a receives a request to retransmit individual parameter data from the SoC 41 (S70, see FIG. 12), the main control circuit 7a transmits information requesting communication to the upstream SoC 41 (S91), and determines whether information indicating a response has been received from the upstream SoC 41 (S92). If information indicating a response has not been received (S92: NO), the main control circuit 7a returns the processing to step S92.

In response to receiving information indicating a response (S92: YES), that is, when communication with the upstream SoC 41 is established, the main control circuit 7a transmits, to the upstream SoC 41, information (inquiry information) of inquiring whether the individual parameter data corresponding to the upstream SoC 41 has been acquired (S93). The main control circuit 7a determines whether response information to the inquiry information has been received from the upstream SoC 41 (S94). If response information has not been received from the upstream SoC 41 (S94: NO), the main control circuit 7a returns the processing to step S94.

If response information has been received from the upstream SoC 41 (S94: YES), the main control circuit 7a determines whether it is necessary to retransmit the individual parameter data corresponding to the upstream SoC 41 to the upstream SoC 41 (S95). When the response information indicates that the upstream SoC 41 has not acquired the individual parameter data, the main control circuit 7a determines that retransmission of the individual parameter data corresponding to the upstream SoC 41 is necessary. When the response information indicates that the upstream SoC 41 has acquired the individual parameter data, the main control circuit 7a determines that retransmission of the individual parameter data is unnecessary. In response to determining that retransmission of the common parameter data to the upstream SoC 41 is unnecessary (S95: NO), the main control circuit 7a ends the individual parameter data retransmission process.

In response to determining that the individual parameter data needs to be retransmitted to the upstream SoC 41 (S95: YES), the main control circuit 7a transmits the individual parameter data corresponding to the upstream SoC 41 to the upstream SoC 41 (S96), and determines whether an acquisition notification indicating that the individual parameter data has been acquired has been received from the upstream SoC 41 (S97). If the acquisition notification has been received (S97: YES), the main control circuit 7a ends the processing.

If the acquisition notification has not been received (S97: NO), the main control circuit 7a determines whether the individual parameter data corresponding to the upstream SoC 41 has been transmitted to the upstream SoC 41 a particular number of times or more (S98). If the data has not been transmitted the particular number of times or more (S98: NO), the main control circuit 7a returns the processing to step S96. The main control circuit 7a has a counter (not shown) for counting the number of times the individual parameter data corresponding to the upstream SoC 41 has been transmitted to the upstream SoC 41 and determines whether the data has been transmitted the particular number of times or more by referring to the counter. The main control circuit 7a increments the counter by one each time the main control circuit 7a transmits the individual parameter data corresponding to the upstream SoC 41 to the upstream SoC 41.

If the data has been transmitted the particular number of times or more (S98: YES), the main control circuit 7a accesses the memory 41d of the upstream SoC 41, writes the individual parameter corresponding to the upstream SoC 41 (S99), and ends the processing.

Figure 15:
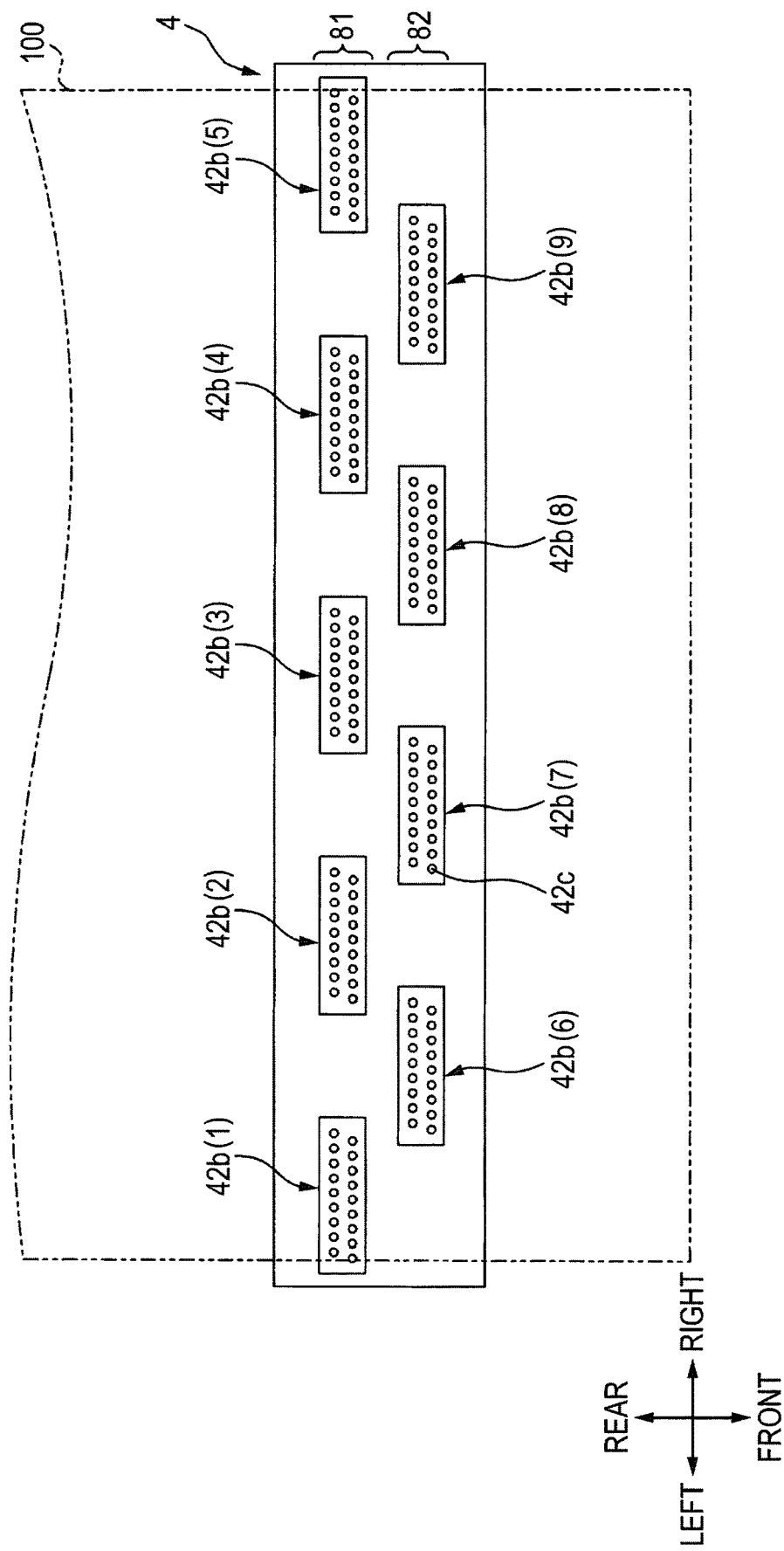
FIG. 15 is a plan view of an inkjet head in which heads are shown for convenience.

A printer according to a fourth embodiment will be described below with reference to the drawing. Among the configurations according to the fourth embodiment, the configurations similar to those of the first embodiment are denoted by the same reference numerals, and detailed description thereof will be omitted. As shown in FIG. 15, an inkjet head 4 includes a plurality of heads 42b. The plurality of heads 42b include nine heads 42b(1) to 42b(9). The plurality of heads 42b are arranged in two rows. The two rows are arranged in the front-rear direction. In a front row 82, four heads 42b(6) to 42(9) are arranged in the left-right direction, and in a rear row 81, five heads 42b(1) to 42b(5) are arranged in the left-right direction. A plurality of nozzles 42c are provided on the lower surface of each of the heads 42b(1) to 42b(9). One head module 40 has one head 42b.

In the fourth embodiment, there are two types of common parameters. The plurality of heads 42b form two rows each extending in the left-right direction. Thus, two types of common parameters are set according to the front-rear positions of the heads 42b. That is, the common parameter for the heads 42b(6) to 42b(9) in the front row 82 of the plurality of heads 42b is different from the common parameter for the heads 42b(1) to 42b(5) in the rear row 81 of the plurality of heads 42b.

Figure 16:
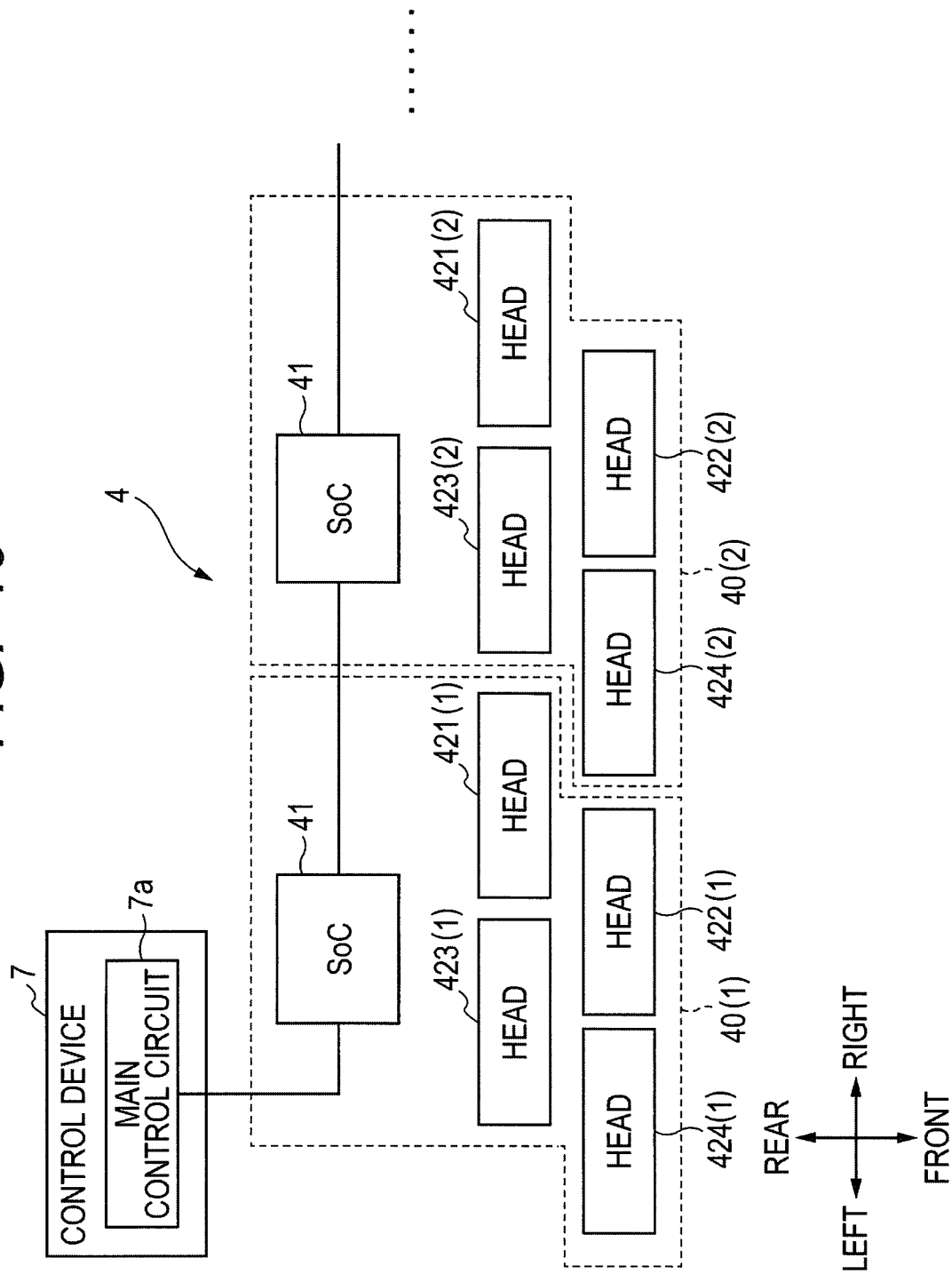
FIG. 16 is a block diagram of a control device and an inkjet head.

A printer according to a fifth embodiment will be described below with reference to the drawing. Among the configurations according to the fifth embodiment, the configurations similar to those of the first embodiment are denoted by the same reference numerals, and detailed description thereof will be omitted. FIG. 16 shows a control device 7 and an inkjet head 4 according to the fifth embodiment. In FIG. 16, the encoder 8, the controller 7b, the memory 7c, the interface 7e, the counter 7d, the controller 41a, the check circuit 41b, the memory 41d, the upstream interface 41e, the downstream interface 41f, and the counter 41g are not shown.

The head module 40(n) includes a first head 421(n), a second head 422(n), a third head 423(n), and a fourth head 424(n) (n=1, 2, ... ). That is, one head module 40(n) has four heads. The four heads are an example of a head unit. The second head 422(n) is located to the right of the fourth head 424(n). The first head 421(n) and the third head 423(n) are arranged at the rear side of the second head 422(n) and the fourth head 424(n). The first head 421(n) is located to the right of the third head 423(n). That is, the first head 421(n), the second head 422(n), the third head 423(n), and the fourth head 424(n) are arranged at different positions from one another.

In the left-right direction, the third head 423(n) is located between the second head 422(n) and the fourth head 424(n). In the left-right direction, the position of the left portion of the third head 423(n) is substantially the same as the right portion of the fourth head 424(n), and the position of the right portion of the third head 423(n) is substantially the same as the left portion of the second head 422(n). In the left-right direction, the position of the left portion of the first head 421(n) is substantially the same as the right portion of the second head 422(n). In the front-rear direction, the positions of the first head 421(n) and the third head 423(n) are substantially the same, and the positions of the second head 422(n) and the fourth head 424(n) are substantially the same. Further, in the front-rear direction, the first head 421(n) and the third head 423(n) are located farther rearward than the second head 422(n) and the fourth head 424(n). That is, the first head 421(n) to the fourth head 424(n) are arranged in a staggered manner such that the right or left portions overlap.

In the fifth embodiment, there are four types of common parameters. One head module 40 has four heads. Thus, four types of common parameters corresponding to each of the four heads are set.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below:

In the first to third embodiments, the distance between the front end and the rear end of the inkjet head 4 is shorter than twice the length of the first head 42(1) in the front-rear direction, twice the length of the second head 42(2) in the front-rear direction, twice the length of the third head 42(3) in the front-rear direction, and twice the length of the fourth head 42(4) in the front-rear direction. The present disclosure is not limited to this configuration. The distance between the front end and the rear end of the inkjet head 4 may be longer or equal to twice the length of the first head 42(1) in the front-rear direction, twice the length of the second head 42(2) in the front-rear direction, twice the length of the third head 42(3) in the front-rear direction, and twice the length of the fourth head 42(4) in the front-rear direction. In this case, too, the first head 42(1), the second head 42(2), the third head 42(3), and the fourth head 42(4) are not arranged in a staggered manner.

In the first to fourth embodiments, one head module 40 has one head. In the fifth embodiment, one head module 40 has four heads. Alternatively, one head module 40 may have two heads, three heads, or five heads.

In the first embodiment, in response to receiving a retransmission request for common parameter data from the SoC 41 (S66, see FIG. 12), the main control circuit 7a transmits information requesting communication to the upstream SoC 41 (S81), and determines whether information indicating a response has been received from the upstream SoC 41 (S82). In response to receiving information indicating a response (S82: YES), the main control circuit 7a transmits, to the upstream SoC 41, information (inquiry information) inquiring whether common parameter data has been acquired (S83). The main control circuit 7a determines whether response information to the inquiry information has been received from the upstream SoC 41 (S84). In response to receiving response information from the upstream SoC 41 (S84: YES), the main control circuit 7a determines whether the common parameter data needs to be retransmitted to the upstream SoC 41 (S85). In response to determining that the common parameter data needs to be retransmitted to the upstream SoC 41 (S85: YES), the main control circuit 7a transmits the common parameter data to the upstream SoC 41 (S86). Alternatively, steps S83, S84 and S85 may be omitted. That is, in response to receiving information indicating a response (S82: YES), the main control circuit 7a may transmit the common parameter data to the upstream SoC 41 (S86).

In the first embodiment, in response to receiving a retransmission request for individual parameter data from the SoC 41 (S71, see FIG. 12), the main control circuit 7a transmits information requesting communication to the upstream SoC 41 (S91), and determines whether information indicating a response has been received from the upstream SoC 41 (S92). In response to receiving information indicating a response (S92: YES), the main control circuit 7a transmits, to the upstream SoC 41, information (inquiry information) for inquiring whether individual parameter data corresponding to the upstream SoC 41 has been acquired (S93). The main control circuit 7a determines whether response information to the inquiry information has been received from the upstream SoC 41 (S94). In response to receiving response information from the upstream SoC 41 (S94: YES), the main control circuit 7a determines whether the individual parameter data corresponding to the upstream SoC 41 needs to be retransmitted to the upstream SoC 41 (S95). In response to determining that the individual parameter data needs to be retransmitted to the upstream SoC 41 (S95: YES), the main control circuit 7a transmits the individual parameter data corresponding to the upstream SoC 41 to the upstream SoC 41 (S96). Alternatively, steps S93, S94 and S95 may be omitted. That is, in response to receiving information indicating a response (S92: YES), the main control circuit 7a may transmit the individual parameter data corresponding to the upstream SoC 41 to the upstream SoC 41 (S96).

In the first embodiment, when the SoC 41 executes the header information process to change the header information corresponding to itself (S13), the SoC 41 changes "1" of the k-th bit to "0". Alternatively, the SoC 41 may change "0" of the k-th bit to "1". That is, when the SoC 41 determines whether an abnormality has occurred in the upstream SoC 41 (S15), for example, if the (k−1)th bit is "0", that is, if it is indicated that the common parameter has not been acquired by the SoC 41(k−1), the SoC 41(k) (k=1, 2, . . . , n−1) determines that an abnormality has occurred in the upstream SoC 41. If the (k−1)th bit is "1", that is, if it is indicated that the common parameter has been acquired by the SoC 41(k−1), the SoC 41(k) determines that no abnormality has occurred in the upstream SoC 41.

In the third embodiment, when the SoC 41 executes the header information process to change the header information corresponding to itself (S63), the SoC 41 changes "1" of the k-th bit to "0". Alternatively, the SoC 41 may change "0" of the k-th bit to "1". That is, when the SoC 41 determines whether an abnormality has occurred in the upstream SoC 41 (S65), for example, if the (k−1)th bit is "0", that is, if it is indicated that the common parameter has not been acquired by the SoC 41(k−1), the SoC 41(k) (k=1, 2, . . . , n−1) determines that an abnormality has occurred in the upstream SoC 41. If the (k−1)th bit is "1", that is, if it is indicated that the common parameter has been acquired by the SoC 41(k−1), the SoC 41(k) determines that no abnormality has occurred in the upstream SoC 41.

In the first embodiment, the SoC 41 executes the header information process to change the header information corresponding to itself (S13). Alternatively, the SoC 41 may indicate that common parameter has been acquired by reducing the data amount of the header information. That is, the SoC 41 determines that an abnormality has occurred in the upstream SoC 41 when the data amount of the header information is smaller than a particular value, and determines that no abnormality has occurred in the upstream SoC 41 when the data amount of the header information matches the particular value. The same goes for S17. In S17, the SoC 41 may indicate that the individual parameter has been acquired, by reducing the data amount of the header information. The particular value is stored in the memory 41d. As the particular value, a different value is stored for each SoC 41.

In the third embodiment, the SoC 41 executes the header information process to change the header information corresponding to itself (S63). Alternatively, the SoC 41 may indicate that common parameter has been acquired by reducing the data amount of the header information. That is, the SoC 41 determines that an abnormality has occurred in the upstream SoC 41 when the data amount of the header information is smaller than a particular value, and determines that no abnormality has occurred in the upstream SoC 41 when the data amount of the header information matches the particular value. The same goes for S67. In S67, the SoC 41 may indicate that the individual parameter has been acquired, by reducing the data amount of the header information. The particular value is stored in the memory 41d. As the particular value, a different value is stored for each SoC 41.

What is claimed is:

1. A printer comprising:
   a plurality of head units each having a nozzle;
   a main control circuit; and
   a plurality of sub control circuits connected to respective ones of the plurality of head units, one of the plurality of sub control circuits being connected to the main control circuit so as to perform communication,
   the plurality of sub control circuits including a first control circuit and a second control circuit, the second control circuit being connected to the first control circuit in series so as to perform communication,
   the first control circuit being configured to:
      receive first data, the first data including a first parameter and a second parameter, the first parameter corresponding to the first control circuit, the second parameter corresponding to the second control circuit; and
      transmit the first data to the second control circuit,
   the second control circuit being configured to:
      receive the first data from the first control circuit; and
      delete the first parameter from the first data.

2. The printer according to claim 1, wherein the second control circuit is configured to determine, based on the first data, whether an abnormality occurs in the first control circuit.

3. The printer according to claim 2, wherein the first data includes first header information corresponding to the first control circuit;
   wherein the first control circuit is configured to change the first header information in the first data or delete the first header information from the first data, and then transmit the first data to the second control circuit; and wherein the second control circuit is configured to, in response to determining that the first header information indicates that the first parameter has not been acquired by the first control circuit or that the first header information exists in the first data, determine that the abnormality occurs in the first control circuit.

4. The printer according to claim 1, wherein the first control circuit is configured to:
receive second data including a common parameter that is common to the plurality of sub control circuits; and
transmit the second data to the second control circuit; and
wherein the second control circuit is configured to:
determine, based on the second data, whether an abnormality occurs in the first control circuit.

5. The printer according to claim 4, wherein the second data includes first header information corresponding to the first control circuit;
wherein the first control circuit is configured to, when receiving the second data, change the first header information in the second data; and
wherein the second control circuit is configured to, in response to determining that the first header information indicates that the common parameter in the second data has not been acquired by the first control circuit, determine that the abnormality occurs in the first control circuit.

6. The printer according to claim 5, wherein the first data includes a plurality of packets corresponding to respective ones of the plurality of sub control circuits; and
wherein each of the plurality of packets includes:
a flag bit configured to store a flag indicating the common parameter or individual parameter, the individual parameter including the first parameter and the second parameter;
header bits configured to store a plurality of header information identifying respective ones of the plurality of sub control circuits, the plurality of header information including the first header information; and
data bits configured to store the individual parameter.

7. The printer according to claim 6, wherein the header information includes an identifier identifying each of the plurality of sub control circuits.

8. The printer according to claim 5, wherein the second data includes:
a flag bit configured to store a flag indicating the common parameter or individual parameter, the individual parameter including the first parameter and the second parameter;
header bits configured to store a plurality of header information corresponding to respective ones of the plurality of sub control circuits, the plurality of header information including the first header information; and
data bits configured to store the common parameter.

9. The printer according to claim 4, wherein the second control circuit is configured to, in response to determining that the abnormality occurs in the first control circuit, execute a retransmission process including:
transmitting first information for requesting communication with the first control circuit;
receiving second information that is a response to the first information;
after receiving the second information, transmitting third information to the first control circuit, the third information inquiring whether the first parameter or the common parameter has been received;
receiving fourth information that is a response to the third information;
transmitting the first parameter or the common parameter to the first control circuit based on the fourth information;
after transmitting the first parameter or the common parameter to the first control circuit, determining whether the first control circuit has acquired the first parameter or the common parameter; and
in response to determining that the first control circuit has acquired the first parameter or the common parameter, ending the retransmission process.

10. The printer according to claim 9, wherein the first control circuit includes a memory; and
wherein the second control circuit is configured to:
in response to determining that the first control circuit has not acquired the first parameter or the common parameter, access the memory of the first control circuit and write the first parameter or the common parameter.

11. The printer according to claim 4, wherein the second control circuit is configured to, in response to determining that the abnormality occurs in the first control circuit, execute a retransmission process including:
transmitting first information for requesting communication with the first control circuit;
receiving second information that is a response to the first information;
after receiving the second information, transmitting the first parameter or the common parameter to the first control circuit;
after transmitting the first parameter or the common parameter to the first control circuit, determining whether the first control circuit has acquired the first parameter or the common parameter; and
in response to determining that the first control circuit has acquired the first parameter or the common parameter, ending the retransmission process.

12. The printer according to claim 11, wherein the first control circuit includes a memory; and
wherein the second control circuit is configured to:
in response to determining that the first control circuit has not acquired the first parameter or the common parameter, access the memory of the first control circuit and write the first parameter or the common parameter.

13. The printer according to claim 4, wherein the second control circuit is configured to, in response to determining that the abnormality occurs in the first control circuit, transmit request information to the main control circuit, the request information being information for requesting the main control circuit to execute a retransmission process including:
transmitting first information for requesting communication with the first control circuit;
receiving second information that is a response to the first information;
after receiving the second information, transmitting the first parameter or the common parameter to the first control circuit;
after transmitting the first parameter or the common parameter to the first control circuit, determining whether the first control circuit has acquired the first parameter or the common parameter; and
in response to determining that the first control circuit has acquired the first parameter or the common parameter, ending the retransmission process.

14. The printer according to claim 13, wherein the first control circuit includes a memory; and
wherein the main control circuit is configured to:
in response to determining that the first control circuit has not acquired the first parameter or the common parameter, access the memory of the first control circuit and write the first parameter or the common parameter.

15. The printer according to claim 4, wherein the plurality of head units are arranged in a line in a first direction and not arranged in a second direction crossing the first direction; and
wherein the common parameter includes one type of common parameter.

16. The printer according to claim 4, wherein the plurality of head units form a first head row and a second head row each arranged in a line in a first direction;
wherein the first head row and second head row are arranged in a second direction crossing the first direction; and
wherein the common parameter includes two types of common parameters corresponding to respective ones of the first head row and the second head row.

17. The printer according to claim 4, wherein the head unit includes a first head, a second head, a third head, and a fourth head;
wherein the first head, the second head, the third head, and the fourth head are arranged at different positions from one another; and
wherein the common parameter includes four types of common parameters corresponding to respective ones of the first head, the second head, the third head, and the fourth head.

18. The printer according to claim 1, wherein the plurality of sub control circuits further include a third control circuit, the third control circuit being connected to the second control circuit in series so as to perform communication;
wherein the first data further includes a third parameter corresponding to the third control circuit;
wherein the first data further includes first header information corresponding to the first control circuit, second header information corresponding to the second control circuit, and third header information corresponding to the third control circuit; and
wherein the second control circuit is configured to:
after receiving the first data from the first control circuit, store the second parameter in a memory of the second control circuit;
change the second header information from information indicating that the second parameter is not acquired to information indicating that the second parameter is acquired;
determine whether an abnormality occurs in the first control circuit, based on the first header information;
in response to determining that no abnormality occurs in the first control circuit, delete the first parameter from the first data; and
transmit, to the third control circuit, the first data including the second parameter and the third parameter.

19. A data transmission method performed in a printer including a plurality of head units each having a nozzle, a main control circuit, and a plurality of sub control circuits connected to respective ones of the plurality of head units, one of the plurality of sub control circuits being connected to the main control circuit so as to perform communication, the plurality of sub control circuits including a first control circuit and a second control circuit, the second control circuit being connected to the first control circuit in series so as to perform communication, the data transmission method comprising:
receiving first data by the first control circuit, the first data including a first parameter and a second parameter, the first parameter corresponding to the first control circuit, the second parameter corresponding to the second control circuit;
transmitting the first data from the first control circuit to the second control circuit;
receiving the first data by the second control circuit, the first data being transmitted from the first control circuit; and
deleting, by the second control circuit, the first parameter from the first data.

20. A non-transitory computer-readable storage medium storing a set of program instructions executable on a printer, the printer including a plurality of head units each having a nozzle, a main control circuit, and a plurality of sub control circuits connected to respective ones of the plurality of head units, one of the plurality of sub control circuits being connected to the main control circuit so as to perform communication, the plurality of sub control circuits including a first control circuit and a second control circuit, the second control circuit being connected to the first control circuit in series so as to perform communication,
the set of program instructions, when executed, causing the first control circuit to perform:
receiving first data, the first data including a first parameter and a second parameter, the first parameter corresponding to the first control circuit, the second parameter corresponding to the second control circuit; and
transmitting the first data to the second control circuit,
the set of program instructions, when executed, causing the second control circuit to perform:
receiving the first data from the first control circuit; and
deleting the first parameter from the first data.

* * * * *